(12) United States Patent
Chen

(10) Patent No.: US 12,238,156 B2
(45) Date of Patent: Feb. 25, 2025

(54) MEDIA PLAYING METHOD AND APPARATUS, AND ELECTRONIC DEVICE

(71) Applicant: Huawei Technologies Co., Ltd., Shenzhen (CN)

(72) Inventor: Gang Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/283,374

(22) PCT Filed: Mar. 18, 2022

(86) PCT No.: PCT/CN2022/081696
§ 371 (c)(1),
(2) Date: Sep. 21, 2023

(87) PCT Pub. No.: WO2022/199484
PCT Pub. Date: Sep. 29, 2022

(65) Prior Publication Data
US 2024/0171626 A1    May 23, 2024

(30) Foreign Application Priority Data

Mar. 24, 2021   (CN) .......................... 202110312246.2

(51) Int. Cl.
*H04L 65/612* (2022.01)
*H04L 65/65* (2022.01)
*H04L 67/56* (2022.01)
*H04N 21/234* (2011.01)

(52) U.S. Cl.
CPC ............ *H04L 65/612* (2022.05); *H04L 65/65* (2022.05); *H04L 67/56* (2022.05); *H04N 21/23406* (2013.01)

(58) Field of Classification Search
None
See application file for complete search history.

(56) References Cited

U.S. PATENT DOCUMENTS

| | | | |
|---|---|---|---|
| 9,479,807 B1 * | 10/2016 | Bugajski | ............ H04N 21/6582 |
| 2007/0101123 A1 * | 5/2007 | Kollmyer | ............ H04N 21/8193 |
| | | | 348/E7.056 |
| 2009/0003600 A1 * | 1/2009 | Chen | ................ H04N 21/44055 |
| | | | 380/217 |

(Continued)

FOREIGN PATENT DOCUMENTS

| | | |
|---|---|---|
| CN | 106507181 A | 3/2017 |
| CN | 104796796 B | 3/2018 |

(Continued)

*Primary Examiner* — Phyllis A Book
(74) *Attorney, Agent, or Firm* — Slater Matsil, LLP

(57) ABSTRACT

A media playing method-includes: receiving a first play request of an application, where the first play request includes a first identifier; sending a first address to the application, where the first address is a local uniform resource locator URL address; buffering, from a server device to a client device, a target media resource that is in the server and that corresponds to the first identifier; and sending, when receiving a second play request sent by the application program to the first address, the buffered target media resource to the application program for playing.

19 Claims, 17 Drawing Sheets

(56) References Cited

U.S. PATENT DOCUMENTS

| | | | | |
|---|---|---|---|---|
| 2012/0284370 | A1* | 11/2012 | Hierro | H04N 21/6373 |
| | | | | 709/219 |
| 2013/0282868 | A1* | 10/2013 | Chung | H04L 65/613 |
| | | | | 709/219 |
| 2014/0201323 | A1* | 7/2014 | Fall | H04L 65/65 |
| | | | | 709/217 |
| 2014/0310386 | A1* | 10/2014 | Srinivasan | H04L 67/02 |
| | | | | 709/219 |
| 2016/0373546 | A1* | 12/2016 | Lotfallah | H04L 65/1069 |
| 2017/0188054 | A1 | 6/2017 | Ma et al. | |
| 2017/0289214 | A1* | 10/2017 | Cho | H04L 65/4015 |
| 2019/0075149 | A1* | 3/2019 | Lu | H04L 65/70 |
| 2019/0182903 | A1 | 6/2019 | Le et al. | |
| 2020/0394246 | A1* | 12/2020 | Shribman | H04L 67/146 |
| 2021/0029080 | A1* | 1/2021 | Shribman | H04L 63/164 |
| 2021/0194986 | A1* | 6/2021 | Shribman | H04L 67/02 |

FOREIGN PATENT DOCUMENTS

| | | | | |
|---|---|---|---|---|
| CN | 108322772 A | | 7/2018 | |
| WO | WO-2014113383 A1 | * | 7/2014 | H04L 65/4076 |

* cited by examiner

MEDIA PLAYING METHOD AND APPARATUS, AND ELECTRONIC DEVICE

CROSS REFERENCE TO RELATED APPLICATIONS

This application is a National Stage of International Patent Application No. PCT/CN2022/081696, filed on Mar. 18, 2022, which claims priority to Chinese Patent Application No. 202110312246.2, filed on Mar. 24, 2021, both of which are hereby incorporated by reference in their entireties.

TECHNICAL FIELD

This application relates to the field of media playing technologies, and in particular, to a media playing method and apparatus, and an electronic device.

BACKGROUND

In a distributed scenario, a client device may be connected to a plurality of server devices through a network, to play a media resource in the server device or control the server device. Currently, manners in which the client device plays the media resource in the server device may include a local playing manner and a real-time streaming transmission and playing manner.

The local playing means that when a user requests to play a media resource, the client device first pulls a complete audio/video file from the server device to the local, and then starts to play the audio/video file. Because the audio/video file is usually large, and it takes a period of time from time when the user requests to play the audio/video file to time when the audio/video file is pulled, the user may feel that there is obvious freezing during playing, real-time playing cannot be implemented, and user experience is poor.

The real-time streaming transmission and playing means that services such as real-time streaming transmission, content distribution, and/or encoding and decoding are deployed on the server device based on a real-time streaming transmission protocol or a projection protocol, such as a real-time streaming protocol (real-time streaming protocol, RTSP) or a real-time streaming protocol (HTTP live streaming, HLS) based on a hypertext transfer protocol (hypertext transfer protocol, HTTP). When the client device requests to play the media resource, the server device sends a media stream to the client device based on the deployed service, and the client device plays the media stream while buffering the media stream. However, the real-time streaming transmission and playing manner requires that the service be deployed on the server device. Therefore, the real-time streaming transmission and playing manner has a high requirement on a capability of the server device, and cannot be implemented between thin devices. In addition, the real-time streaming transmission and playing manner also has a specific requirement on network quality. If a buffering speed for the media stream is excessively low, there is freezing during playing.

It can be seen that there is no feasible solution for cross-device real-time media playing between thin devices.

SUMMARY

Embodiments of this application provide a media playing method and apparatus, and an electronic device, to implement cross-device real-time media playing between thin devices.

According to a first aspect, an embodiment of this application provides a media playing method. The method includes: A media proxy service on a client device receives a first play request of an application program on the client device, where the first play request includes a first identifier, and first identifier corresponds to a target media resource in a server device. The media proxy service determines, based on the first identifier, whether a buffering transmission procedure of the target media resource has been started. If the buffering transmission procedure has not been started, the media proxy service starts the buffering transmission procedure to buffer the target media resource from the server device to the client device, and sends a first address to the application program, where the first address is a local uniform resource locator URL address that is of the client device and that is used for accessing the buffered target media resource. The media proxy service sends, when receiving a second play request sent by the application program to the first address, the buffered target media resource to the application program for playing.

According to the media playing method provided in this embodiment of this application, the media proxy service is built on the client. When the application program requests to play a media resource of the server device, the client device may first buffer the media resource locally by using the media proxy service, so that the application program can directly request the media proxy service to obtain the media resource locally and play the media resource. In this way, the server device only needs to provide a common file transfer function for the client device, and does not participate in or perceive a playing process. Therefore, a playing-related service does not need to be deployed, which lowers a capability requirement on the server device, and implements cross-device real-time media playing between thin devices.

In an implementation, after that the media proxy service determines whether a buffering transmission procedure of the target media resource has been started, the method further includes: If the buffering transmission procedure has been started but the buffering transmission procedure is suspended, the media proxy service continues the buffering transmission procedure to continue to buffer the target media resource from the server device to the client device based on a buffering progress of the target media resource, and sends a second address to the application program, where the second address is a local URL address that is of the client device and that is used for accessing the buffered target media resource. The media proxy service sends, when receiving a third play request sent by the application program to the second address, the buffered target media resource to the application program for playing. In this way, when buffering transmission is resumed from a suspended status, the media proxy service may continue to buffer the target media resource in an incremental transmission manner without re-buffering.

In an implementation, after that the media proxy service determines whether a buffering transmission procedure of the target media resource has been started, the method further includes: If the target media resource has been completely buffered in the client device, the media proxy service sends a third address to the application program, to enable the application program to obtain the target media resource from the third address for playing, where the third address is a file path of the target media resource buffered in the client device. In this way, after the target media resource has been buffered locally, the application program may directly access a locally stored target media resource file for playing, and the media proxy service does not need to generate a media stream.

In an implementation, after that the media proxy service determines whether a buffering transmission procedure of the target media resource has been started, the method further includes: If the target media resource has been completely buffered in the client device, the media proxy service sends a fourth address to the application program, where the fourth address is a local URL address that is of the client device and that is used for accessing the buffered target media resource. The media proxy service sends, when receiving a fourth play request sent by the application program to the fourth address, the buffered target media resource to the application program for playing. In this way, after the target media resource has been buffered locally, the media proxy service may also continue to generate a media stream for the application program, and the application program may receive and play the media stream sent by the media proxy service.

In an implementation, the first address includes a local internet protocol IP address and a first port that are of the client device. The second play request is a hypertext transfer protocol HTTP request.

In an implementation, that the media proxy service sends, when receiving a second play request sent by the application program to the first address, the buffered target media resource to the application program includes: The media proxy service listens to the first port of the local IP address. The media proxy service generates a first response message when obtaining the second play request through listening, where the first response message is an HTTP response message, and the first response message includes a media stream generated based on the target media resource that has been buffered. In this way, data may be transmitted, for example, a media stream may be transmitted between the media proxy service and the application program based on the HTTP protocol.

In an implementation, the method further includes: When the media proxy service receives a play stop request of the application program, if the buffering transmission procedure is being performed, the media proxy service suspends the buffering transmission procedure, and records the buffering progress of the target media resource. In this way, when a user performs subsequent playing, the media proxy service may continue to perform the buffering transmission procedure based on the buffering progress.

According to a second aspect, an embodiment of this application provides a media playing method. The method includes: An application program on a client device sends a first play request to a media proxy service on the client device, where the first play request includes a first identifier, and the first identifier corresponds to a target media resource in a server device. The application program receives a destination address sent by the media proxy service. If the destination address is a local URL address of the client device, the application program sends a second play request to the local URL address. The application program receives and plays the target media resource that is sent by the media proxy service in response to the second play request, where the target media resource is buffered by the media proxy service from the server device to the client device. According to the media playing method provided in this embodiment of this application, the media proxy service is built on the client device. When the application program requests to play a media resource of the server device, the client device may first buffer the media resource locally by using the media proxy service, so that the application program can directly request the media proxy service to obtain the media resource locally and play the media resource. In this way, the server device only needs to provide a common file transfer function for the client device, and does not participate in or perceive a playing process. Therefore, a playing-related service does not need to be deployed, which lowers a capability requirement on the server device, and implements cross-device real-time media playing between thin devices.

In an implementation, after that the application program receives a destination address sent by the media proxy service, the method further includes: If the destination address is a file path address in the client device, the application program obtains the target media resource from the file path address for playing. In this way, after the target media resource has been buffered locally, the application program may directly access a locally stored target media resource file for playing, and the media proxy service does not need to generate a media stream.

In an implementation, the local URL address includes a local IP address and a first port that are of the client device. The second play request is a hypertext transfer protocol HTTP request.

In an implementation, that the application program sends a second play request to the local URL address includes: The application program sends the second play request to the first port of the local IP address.

In an implementation, that the application program receives the target media resource that is sent by the media proxy service in response to the second play request includes: The application program receives a first response message that is sent by the media proxy service in response to the second play request, where the first response message is an HTTP response message, and the first response message includes a media stream generated by the media proxy service based on the target media resource that has been buffered. In this way, data may be transmitted, for example, a media stream may be transmitted between the media proxy service and the application program based on the HTTP protocol.

According to a third aspect, an embodiment of this application provides a media playing apparatus. The apparatus includes: a virtual server, configured to receive a first play request of an application program on a client device, where the first play request includes a first identifier, the first identifier corresponds to a target media resource in a server device, and the virtual server is further configured to determine, based on the first identifier, whether a buffering transmission procedure of the target media resource has been started; and a file buffering unit, configured to: if the buffering transmission procedure has not been started, start the buffering transmission procedure to buffer the target media resource from the server device to the client device, where the virtual server is further configured to send a first address to the application program, where the first address is a local uniform resource locator URL address that is of the client device and that is used for accessing the buffered target media resource; and the virtual server is further configured to send, when receiving a second play request sent by the application program to the first address, the buffered target media resource to the application program for playing.

In an implementation, the file buffering unit is further configured to: if the buffering transmission procedure has been started but the buffering transmission procedure is suspended, continue the buffering transmission procedure to continue to buffer the target media resource from the server device to the client device based on a buffering progress of the target media resource; the virtual server is further configured to send a second address to the application program, where the second address is a local URL address that is of the client device and that is used for accessing the buffered target media resource; and the virtual server is further configured to send, when receiving a third play request sent by the application program to the second address, the buffered target media resource to the application program for playing.

In an implementation, the virtual server is further configured to: if the target media resource has been completely buffered in the client device, send a third address to the application program, to enable the application program to obtain the target media resource from the third address for playing, where the third address is a file path of the target media resource buffered in the client device.

In an implementation, the virtual server is further configured to: if the target media resource has been completely buffered in the client device, send a fourth address to the application program, where the fourth address is a local URL address that is of the client device and that is used for accessing the buffered target media resource; and the virtual server is further configured to send, when receiving a fourth play request sent by the application program to the fourth address, the buffered target media resource to the application program for playing.

In an implementation, the first address includes a local internet protocol IP address and a first port that are of the client device. The second play request is a hypertext transfer protocol HTTP request.

In an implementation, that the virtual server is configured to send, when receiving a second play request sent by the application program to the first address, the buffered target media resource to the application program includes: the virtual server is configured to listen to the first port of the local IP address; and the virtual server is further configured to generate a first response message when obtaining the second play request through listening, where the first response message is an HTTP response message, and the first response message includes a media stream generated based on the target media resource that has been buffered.

In an implementation, the virtual server is further configured to: when a play stop request of the application program is received, if the buffering transmission procedure is being performed, suspend the buffering transmission procedure, and record the buffering progress of the target media resource.

According to a fourth aspect, an embodiment of this application provides a media playing apparatus. The apparatus includes: a first sending unit, configured to send a first play request to a media proxy service on a client device, where the first play request includes a first identifier, and the first identifier corresponds to a target media resource in a server device; an address receiving unit, configured to receive a destination address sent by the media proxy service; a second sending unit, configured to: if the destination address is a local URL address of the client device, send a second play request to the local URL address; and a playing unit, configured to receive and play the target media resource that is sent by the media proxy service in response to the second play request, where the target media resource is buffered by the media proxy service from the server device to the client device.

In an implementation, the playing unit is further configured to: if the destination address is a file path address in the client device, obtain the target media resource from the file path address for playing.

In an implementation, the local URL address includes a local IP address and a first port that are of the client device. The second play request is a hypertext transfer protocol HTTP request.

In an implementation, that a second sending unit is configured to send a second play request to the local URL address includes: sending the second play request to the first port of the local IP address.

In an implementation, that a playing unit is configured to receive the target media resource that is sent by the media proxy service in response to the second play request includes: receiving a first response message sent by the media proxy service in response to the second play request, where the first response message is an HTTP response message, and the first response message includes a media stream generated by the media proxy service based on the target media resource that has been buffered.

According to a fifth aspect, an embodiment of this application provides an electronic device, including: a media proxy service module and an application program module, where the media proxy service module is configured to perform the method according to the first aspect and the implementations of the first aspect; and the application program module is configured to perform the method according to the second aspect and the implementations of the second aspect.

According to a sixth aspect, an embodiment of this application further provides a computer-readable storage medium, where the computer-readable storage medium stores instructions; and when the instructions are run on a computer, the computer is enabled to perform the method according to the foregoing aspects.

According to a seventh aspect, an embodiment of this application further provides a computer program product including instructions, where when the computer program product runs on a computer, the computer is enabled to perform the method according to the foregoing aspects.

According to an eighth aspect, an embodiment of this application further provides a chip system, where the chip system includes a processor, configured to support the foregoing apparatus or system in implementing a function in the foregoing aspects, for example, generating or processing information in the foregoing method.

DETAILED DESCRIPTION OF ILLUSTRATIVE EMBODIMENTS

A distributed scenario refers to a scenario in which a plurality of devices are connected to each other through a network and exchange information and data with each other, to jointly complete an objective of a task.

Figure 1:
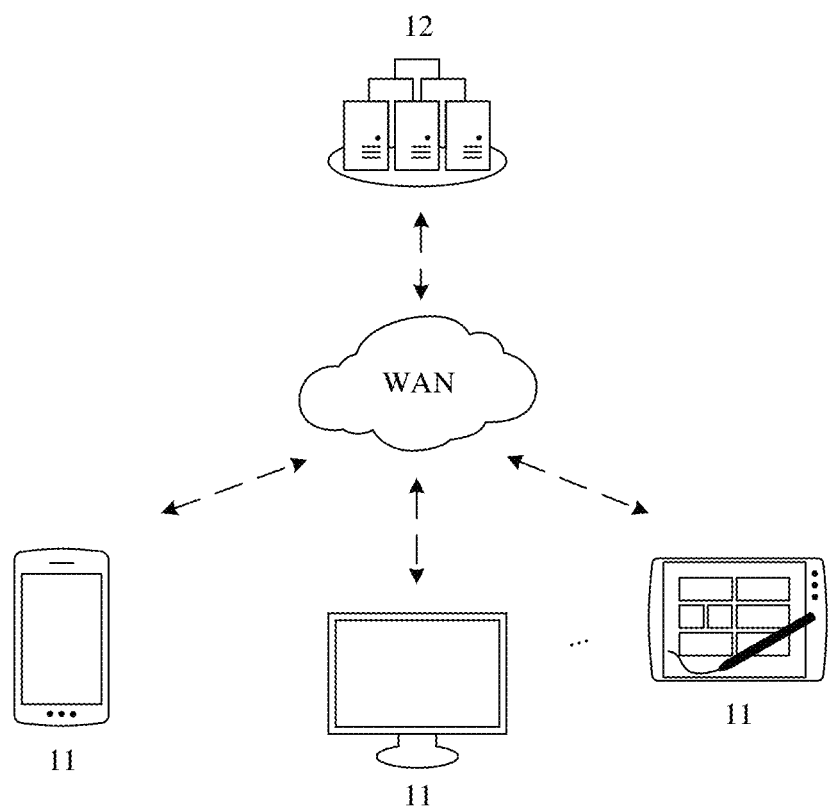
FIG. 1 is a schematic diagram of an architecture of a current distributed scenario.

FIG. 1 is a schematic diagram of an architecture of a current distributed scenario. As shown in FIG. 1, the architecture of the distributed scenario may include one or more client devices 11 and a server 12. The one or more client devices 11 are connected to the server 12 in a wide area network (wide area network, WAN). The client device 11 may include, for example, a mobile phone, a notebook computer, a tablet computer, a large-screen display device, a virtual/hybrid/augmented reality device, and a local server. This is not limited in this embodiment of this application. Based on different tasks performed in the distributed scenario, the server 12 may include, for example, a media server, an application program server, a storage server, a web server, a data center, and a content distribution node. This is not limited in this embodiment of this application.

Figure 2:
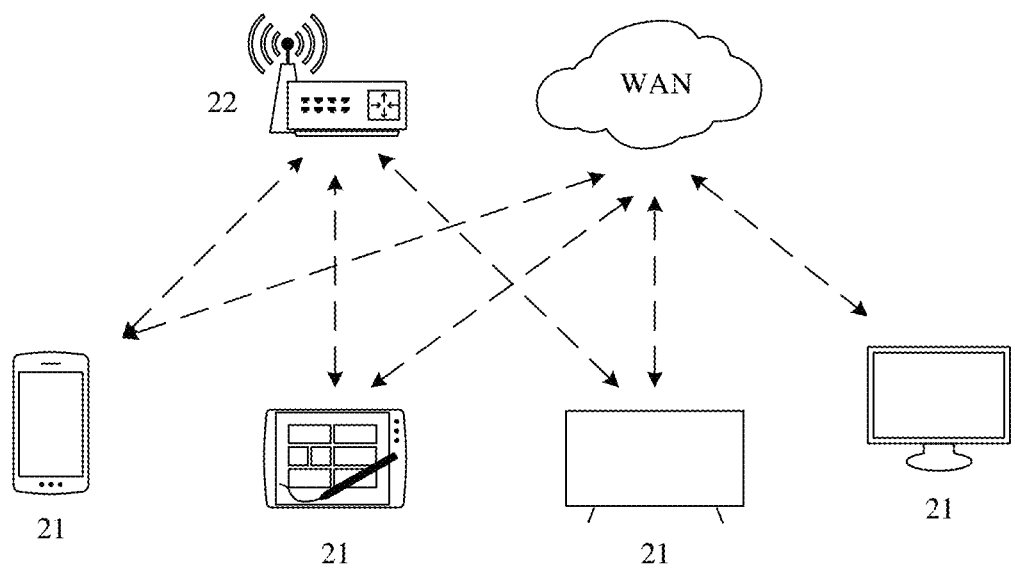
FIG. 2 is a schematic diagram of an architecture of another current distributed scenario.

FIG. 2 is a schematic diagram of an architecture of another current distributed scenario. As shown in FIG. 2, the distributed scenario may include a plurality of terminal devices 21, and the plurality of terminal devices 21 may establish connections through a wide area network WAN or a local area network (local area network, LAN). For example, when the plurality of terminal devices 21 establish the connections through the local area network WAN, the plurality of terminal devices 21 may access a wireless local area network (Wireless LAN, WLAN) created by a wireless access point (wireless access point, WAP) 22, and data is transmitted between the plurality of terminal devices 21 by forwarding by the wireless access point 22. The terminal device 21 herein may include, for example, a mobile phone, a notebook computer, a tablet computer, a large-screen display device, a virtual/hybrid/augmented reality device, a network attached storage (network attached storage, NAS), and a router with a memory function. The router may be used as the wireless access point in the distributed scenario.

In an implementation, the distributed scenario may be used for implementing a cross-device playing function for a media object, that is, one device plays a media resource in another device. For ease of description herein, a device for playing a media resource is referred to as a client device, and a device for providing media content is referred to as a server device. In this case, a manner of playing the media content by the client device usually may include local playing and real-time streaming transmission and playing. The local playing means that when a user requests to play a media resource, the client device first pulls a complete media file from the server device to the local, and then starts to play the media file. The real-time streaming transmission and playing means that services such as real-time streaming transmission, content distribution, and/or encoding and decoding are deployed on the server device based on a real-time streaming transmission protocol or a projection protocol. When the client device requests to play the media resource, the server device sends a media stream to the client device based on the deployed service, and the client device plays the media stream while buffering the media stream.

Figure 3A:
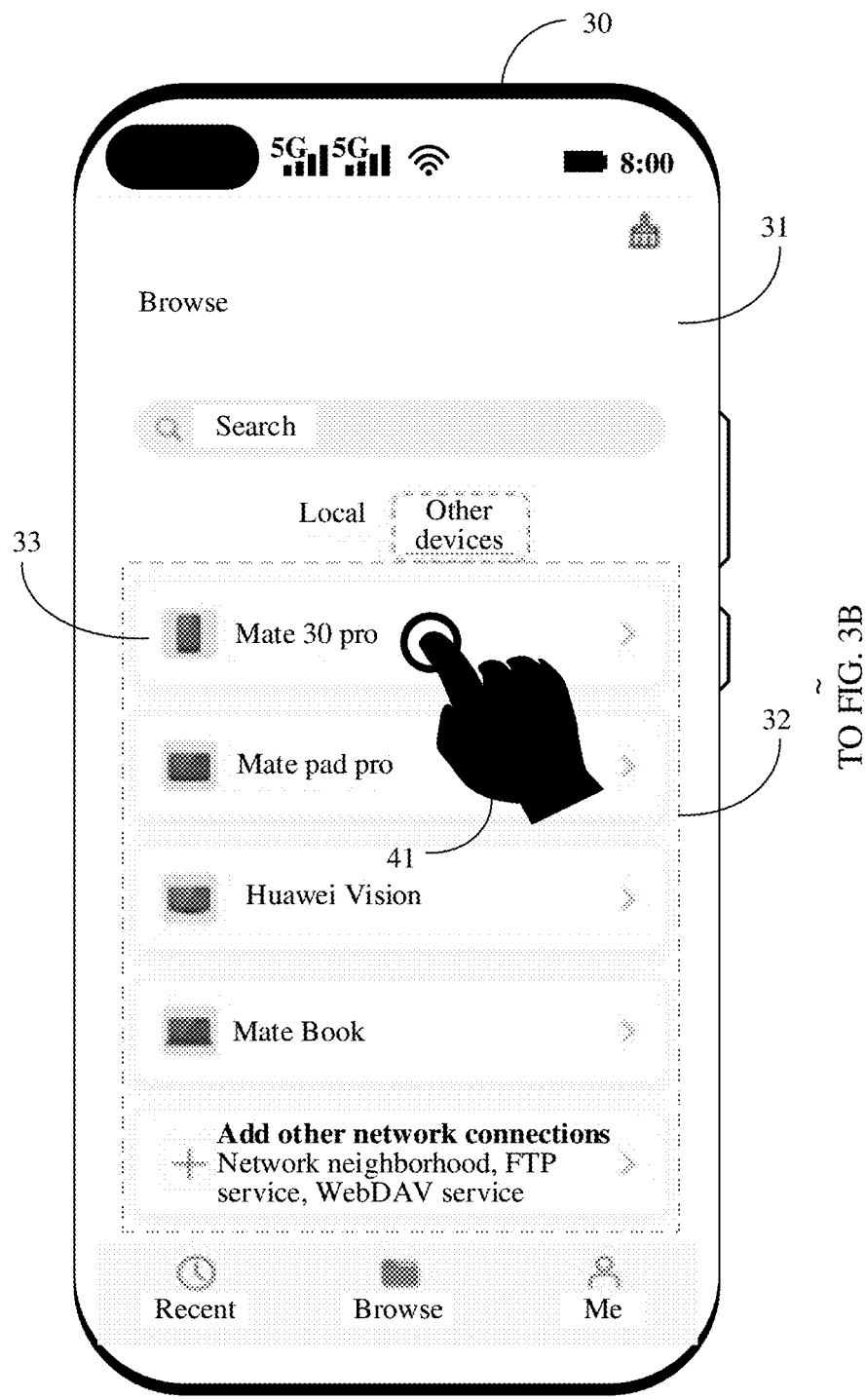
FIG. 3A to FIG. 3C are a schematic diagram of playing, by a user on a client device, a media resource in a server device according to an embodiment of this application.
Figure 3B:
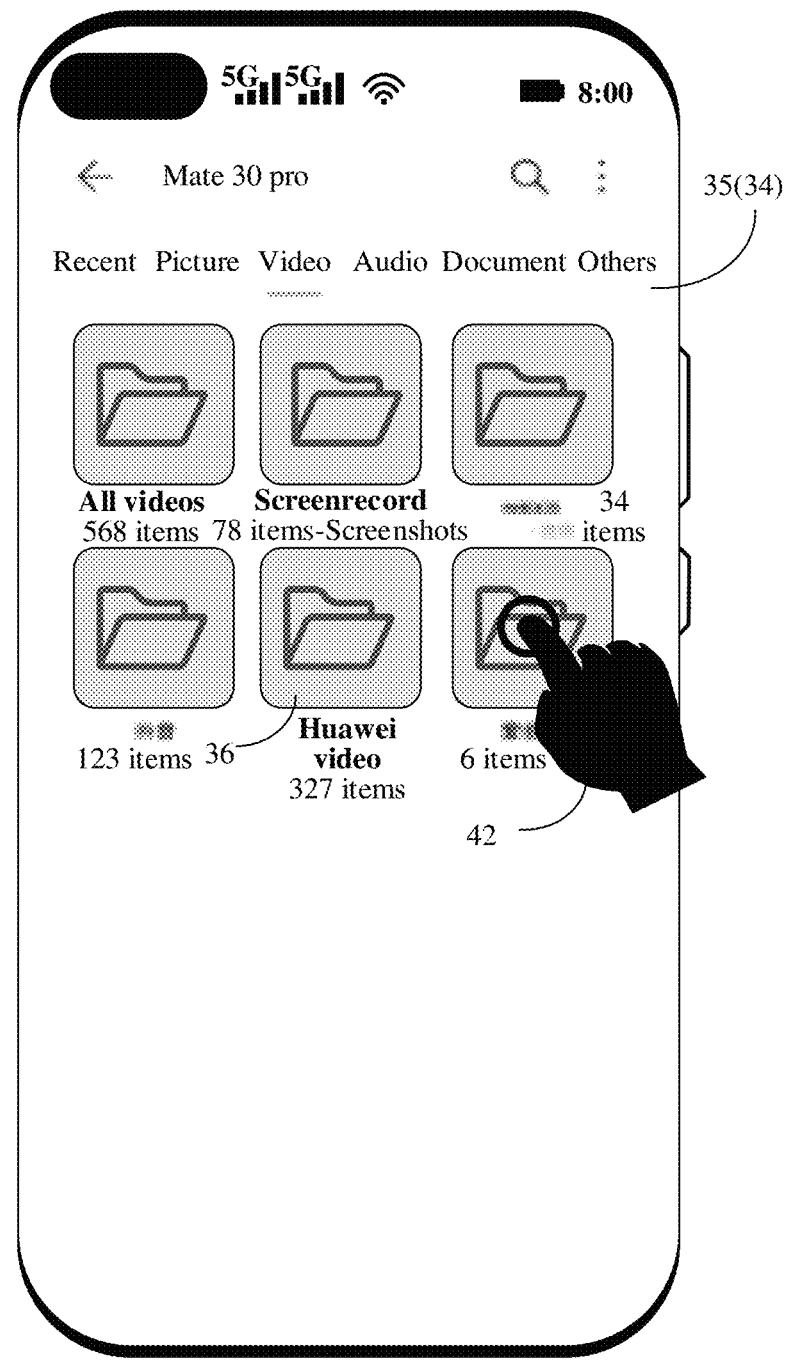
Figure 3C:
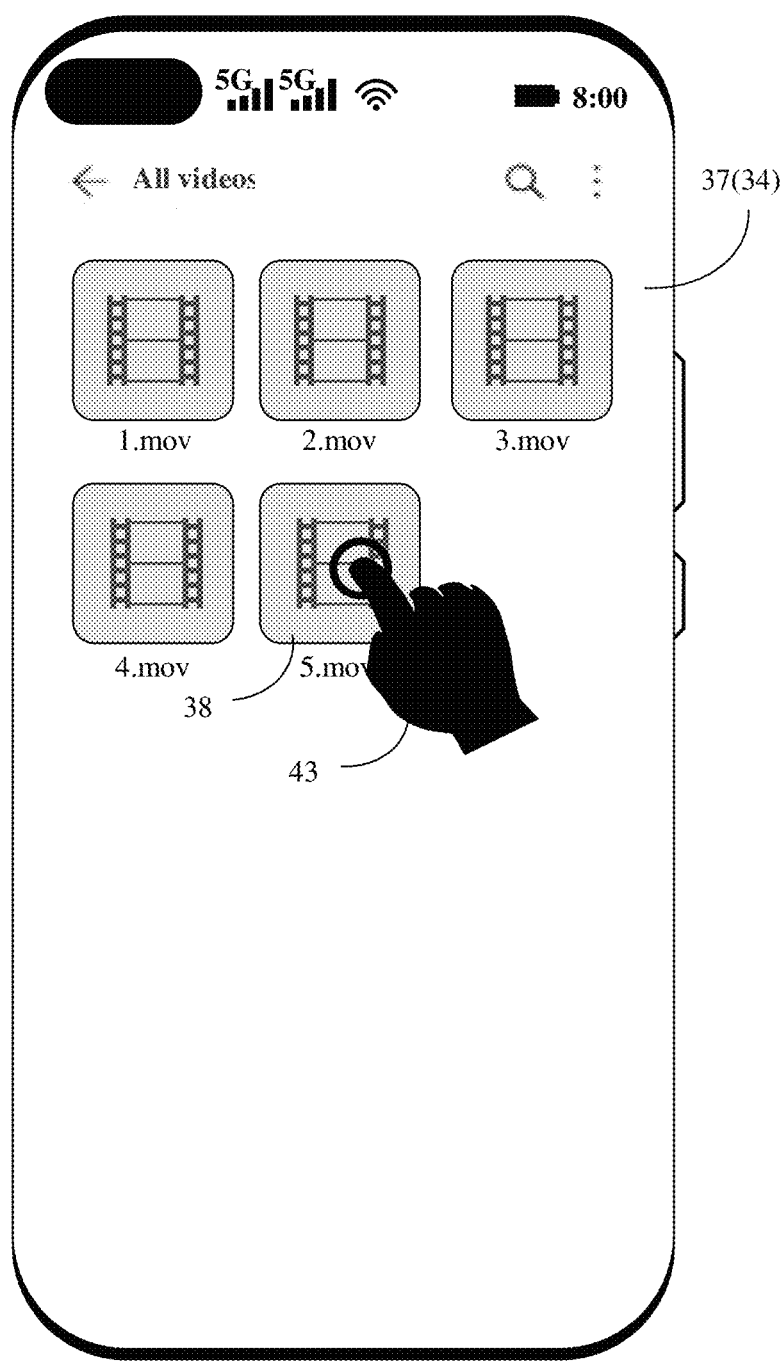

FIG. 3A to FIG. 3C are a schematic diagram of performing, by a user, a gesture operation on a client device to play a media resource in a server device according to an embodiment of this application.

The following describes an example of a local playing procedure with reference to FIG. 3A to FIG. 3C.

As shown in FIG. 3A to FIG. 3C, the user may operate the client device 30 to enter a distributed entry interface 31 that is provided by the client device 30 and that corresponds to media playing. For example, the interface may include a server device list 32, and the server device list 32 may include information 33 of some or all server devices in the distributed scenario. The information 33 of the server device may include, for example, one or more of the following information: a device model (for example, Mate 30 Pro or Huawei Vision), a device name (a user-defined name, for example, Xiao Ming's Huawei mobile phone), a device type (for example, a mobile phone, a tablet computer, a notebook computer, or a large-screen display device), a device status (online/offline), and a device occupation status (for example, whether the device is occupied by another user device).

Further, as shown in FIG. 3A to FIG. 3C, when the user taps 41 information 33 of any server device in the server device list 32, the client device 31 may display a media resource page 34 of the server device. The media resource page 34 may display, by using an icon and/or a text, a media file stored in the server device, where the icon may be, for example, a thumbnail of a video or a picture, and the text may be, for example, a name of the media file.

In an implementation, the media resource page 34 may include a plurality of layers of pages. For example, when the user enters the media resource page 34, the media resource page may display a first-layer page 35, where the first-layer page 35 includes at least one folder 36, and displays a name of each folder and a quantity of files included in each folder. These folders may be created by the user, locally automatically created, or created by an application program in a local program, and are used for classifying media files by source, and so on. The folder 36 may have a thumbnail of one or more files included therein as an icon. When the user taps 42 any folder 36 on the first-layer page 35, the client device 31 displays a second-layer page 37 corresponding to the folder 36, where the second-layer page 37 may include information such as an icon 38 and a name that are of each media file in the folder 36. It may be understood that, during implementation, the media resource page 34 may include fewer layers of pages (for example, include only the first-layer page 35 or only the second-layer page 37), or may include more layers of pages. This may be specifically determined based on a storage path of a media file in the server device. This is not limited in this embodiment of this application.

Next, the user may tap 43 an icon 38 of any media file to request playing, and file transfer may be established between the client device and the server device, so that the media file in the server device is transferred to the client device. After receiving the complete media file, the client device starts to play the media file. A process of accessing and transferring the media file may be implemented by using a file transfer protocol (file transfer protocol, FTP) service, a Web-based distributed authoring and versioning (WebDAV) service, or the like. This is not limited in this embodiment of this application.

It may be understood that, local playing is similar to downloading a media resource from a network and then play the media resource. A media file needs to be first pulled from the server device to the client device, and then played. Therefore, there is a specific delay from time when the user requests to play the media file to time when the media file starts to be played. As a result, the user experiences freezing. This delay is usually determined based on a file transfer speed and a size of a media file. For example, if the media file is a movie, transfer time may be as long as dozens of seconds, which severely affects user experience.

Figure 4A:
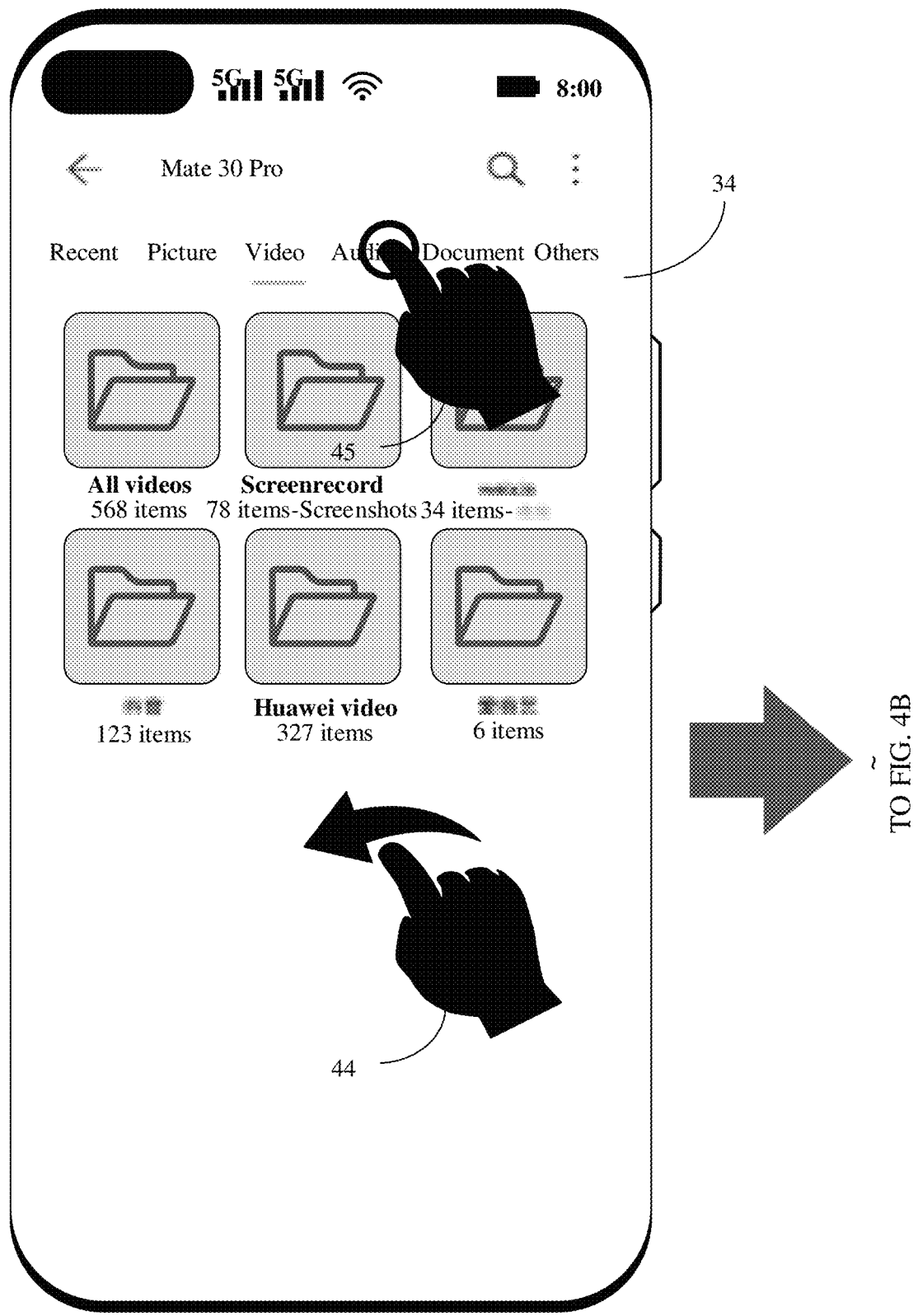
FIG. 4A and FIG. 4B are a schematic diagram of a subpage of a media resource page according to an embodiment of this application.
Figure 4B:
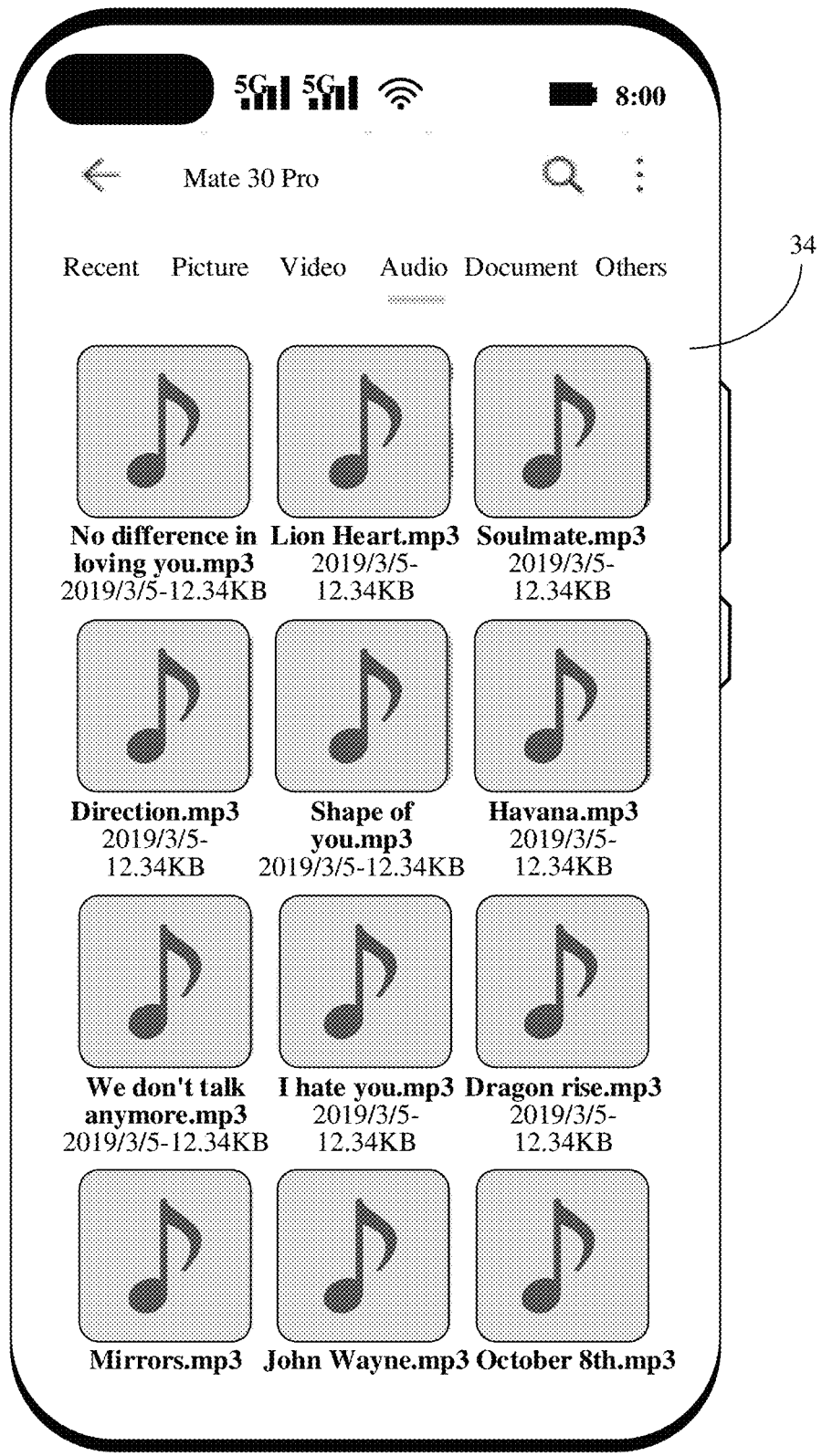

In an implementation, as shown in FIG. 4A and FIG. 4B, when a media file in the server device includes a plurality of types, the media resource page 34 may further include a plurality of subpages, and each subpage corresponds to one type. The user may switch between different subpages by using a sliding operation 44 or by tapping 45 a name of a subpage. The plurality of types may include, for example, "picture", "video", "audio", "document", "others", and "recent". This is not limited in this embodiment of this application.

Figure 5:
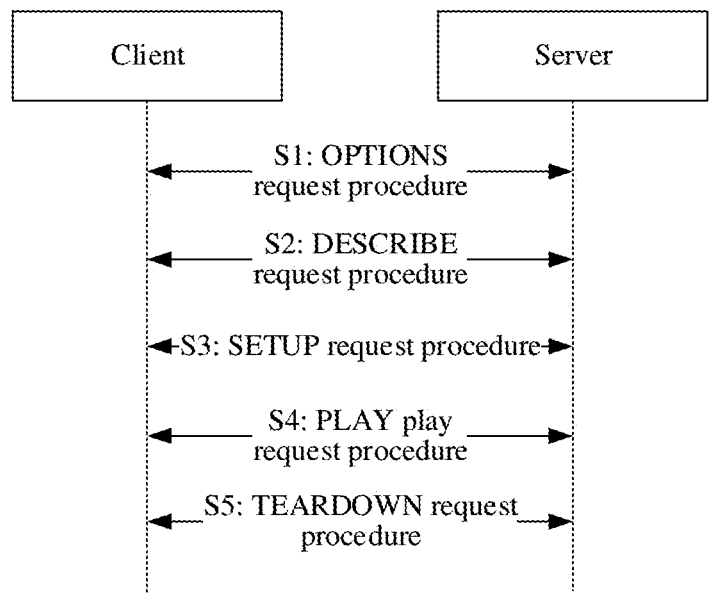
FIG. 5 is a schematic diagram of real-time streaming transmission and playing based on a real-time streaming protocol RTSP.

FIG. 5 is a schematic diagram of real-time streaming transmission and playing based on a real-time streaming protocol RTSP. The real-time streaming protocol RTSP is a network application protocol designed for use by entertainment and communication systems to control a server. This protocol is used for creating and controlling a media session between terminals. A client connected to the server may issue a command, such as playing, recording, and pausing, to control a media stream from the server to the client or from the client to the server in real time. As shown in FIG. 4A and FIG. 4B, the real-time streaming transmission and playing based on the real-time streaming protocol RTSP may be implemented through the following steps.

Step S1: OPTIONS request procedure. The details are as follows:
  Step S11: The client sends an OPTIONS request message (OPTIONS request) to the server, to request a request type acceptable to the server.
  Step S12: The server sends an OPTIONS response message (OPTIONS response) to the client, to send all request types acceptable to the server to the client.
Step S2: DESCRIBE request procedure. The details are as follows:
  Step S21: The client sends a DESCRIBE request message (DESCRIBE request) to the server, to request to obtain media initialization description information from the server.
  Step S22: The server sends a DESCRIBE response message (DESCRIBE response) to the client, to send the media initialization description information to the client.
Step S3: SETUP request procedure. The details are as follows:
  Step S31: The client sends a SETUP request message (SETUP request) to the server, to set an attribute and a transmission mode of a media session, and remind the server to establish the session.
  Step S32: The server establishes the session, and sends a SETUP response message (SETUP response) to the client, to send a session identifier and related information to the client.
Step S4: PLAY play request procedure. The details are as follows:
  Step S41: The client sends a play request message (PLAY request) to the server, to request to play a media resource.
  Step S42: The server sends streaming media data (a PLAY response) to the client in response to the PLAY request.
Step S5: TEARDOWN request procedure. The details are as follows:
  Step S51: The client sends a TEARDOWN request message (TEARDOWN request) to the server, to request to close the media session.
  Step S52: The server closes the session (a TEARDOWN response) in response to the TEARDOWN request.

It can be learned that the real-time streaming transmission and playing based on the RTSP involves a large quantity of interaction procedures and has high requirements on device resources. In addition, the RTSP requires that an RTSP service be deployed on the server device. Usually, for a fat device such as the server, deployment of the RTSP service is feasible. However, for a thin device such as a mobile phone or a tablet computer, the deployment of the RTSP service has a performance bottleneck. Therefore, the real-time streaming transmission and playing based on the RTSP is difficult to be implemented in the scenario shown in FIG. 2. In addition, streaming media transmission and playing based on the RTSP are simultaneously performed. Therefore, playing smoothness depends on network quality. When the network quality is poor, there may be freezing during playing.

Figure 6:
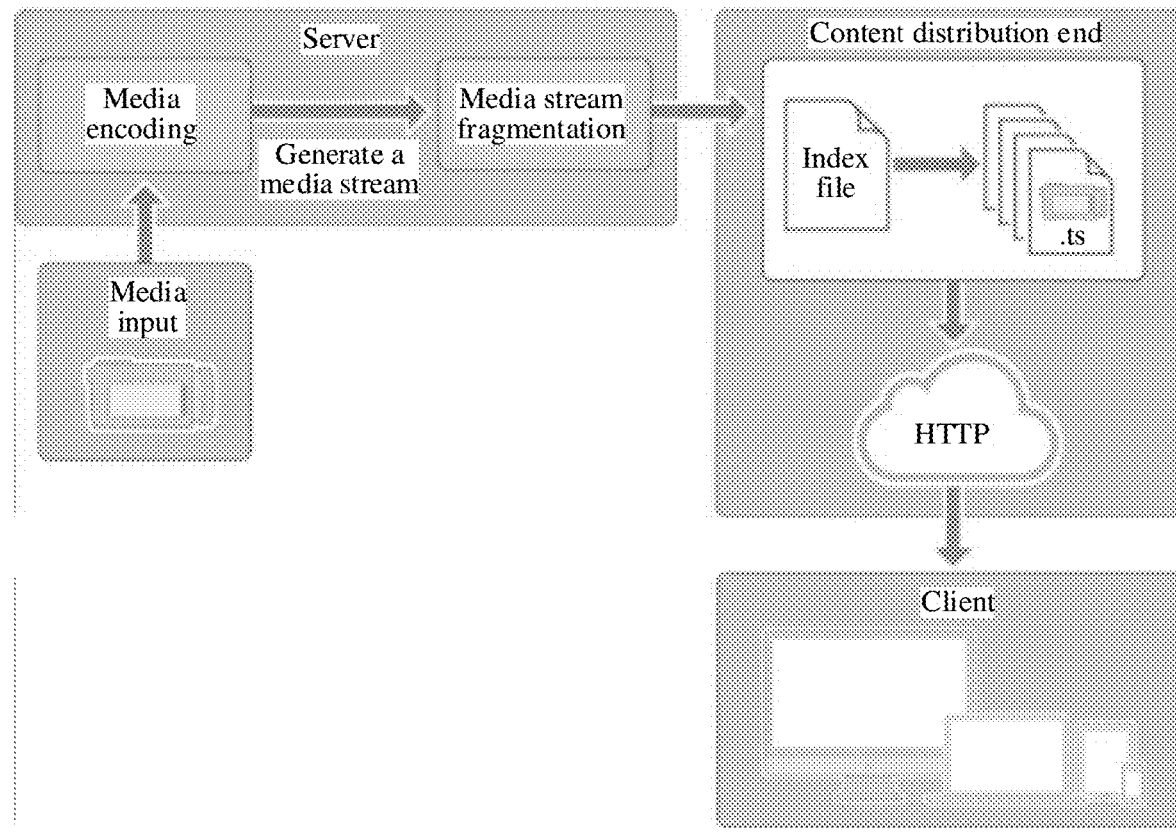
FIG. 6 is a schematic diagram of real-time streaming transmission and playing based on a real-time streaming protocol HLS.

FIG. 6 is a schematic diagram of real-time streaming transmission and playing based on a real-time streaming protocol HLS. The HLS is a streaming media network transport protocol based on a hypertext transfer protocol (HTTP). A working principle of the HLS is that an entire stream is divided into small HTTP-based files for downloading, and only a few are downloaded at a time. While a streaming media is playing, a client may choose to download a same resource at different rates from many different alternate sources. This allows a streaming media session to adapt to different data rates. To implement a corresponding function of the foregoing HLS, as shown in FIG. 6, the HLS needs to include a content distribution end Distribution in addition to a server and the client. With reference to FIG. 5, a specific procedure in which the HLS implements the real-time streaming transmission and playing may include the following steps.

On the server: The server obtains a media resource, encodes the media resource to obtain a media stream, then fragments the media stream by using a stream fragmenter to obtain a plurality of small video files (.ts), generates a playlist file (index file) corresponding to these video files, and finally sends the obtained video files (.ts) and the playlist file to the content distribution end.

On the content distribution end and the client: The content distribution end is configured to store the video file (.ts), and may send the playlist file (Index file) to the client. The client may obtain, based on the list file (Index file), an address of each video file (.ts) stored on the content distribution end, and then obtain and play the video file (.ts) based on the address.

It can be learned that the real-time streaming transmission and playing based on the HLS requires that a file fragmentation service and a content distribution service be deployed in the server device, which has high requirements on device resources, and is also difficult to be implemented in the scenario shown in FIG. 2. In addition, streaming media transmission and playing based on the HLS are also simultaneously performed. Therefore, playing smoothness depends on network quality. When the network quality is poor, there may also be freezing during playing.

In addition, some projection solutions may be used for implementing real-time streaming transmission and playing in a distributed scenario. However, these solutions also require that media decoding and encoding services be deployed on the server, and streaming media transmission and playing are also simultaneously performed. Therefore, these solutions have the same problem as the RTSP and HLS solutions.

To resolve the foregoing problem, implement real-time streaming transmission and playing between thin devices, and improve smoothness of streaming media playing, an embodiment of this application provides a media playing method.

The method provided in this embodiment of this application is applicable to the distributed scenario shown in FIG. 1 or FIG. 2, and is preferably applicable to the distributed scenario including thin devices provided in FIG. 2.

Figure 7:
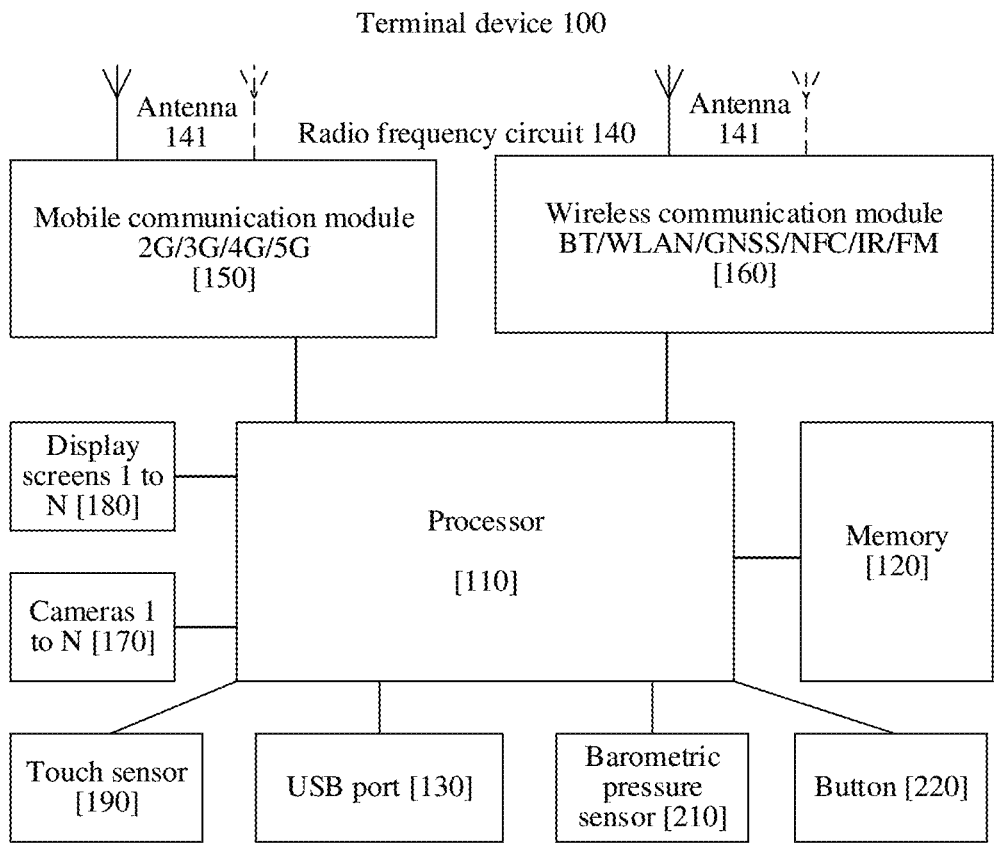
FIG. 7 is a schematic diagram of a hardware structure of a terminal device according to an embodiment of this application.

FIG. 7 is a schematic diagram of a hardware structure of a terminal device according to an embodiment of this application. As shown in FIG. 7, the terminal device 100 may include a processor no, a memory 120, a universal serial bus (universal serial bus, USB) interface 130, a radio frequency circuit 140, a mobile communication module 150, a wireless communication module 160, a camera 170, a display screen 180, a touch sensor 190, a barometric pressure sensor 210, a button 220, and the like.

The processor 110 may include one or more processing units. For example, the processor 110 may include an application processor (application processor, AP), a modem processor, a graphics processing unit (graphics processing unit, GPU), an image signal processor (image signal processor, ISP), a video codec, a digital signal processor (digital signal processor, DSP), a baseband processor, and/or a neural-network processing unit (neural-network processing unit, NPU), and the like. Different processing units may be independent components, or may be integrated into one or more processors, for example, integrated into a system on a chip (system on a chip, SoC). A memory may be further disposed in the processor 110, and is configured to store instructions and data. In some embodiments, the memory in the processor 110 is a cache memory. The memory may store an instruction or data that has been used or cyclically used by the processor 110.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The memory 120 may be configured to store computer-executable program code, and the executable program code includes instructions. The memory 120 may include a program storage area and a data storage area. The program storage area may store an operating system, an application program required by at least one function (for example, a sound play function or an image play function), and the like. The data storage area may store data (for example, audio data and a phone book) and the like created during use of the terminal device 100. In addition, the memory 120 may include one or more storage units, for example, may include a volatile memory (volatile memory) such as a dynamic random access memory (dynamic random access memory, DRAM) or a static random access memory (static random access memory, SRAM). The memory 120 may further include a non-volatile memory (non-volatile memory, NVM) such as a read-only memory (read-only memory, ROM) or a flash memory (flash memory). The processor 110 runs instructions stored in the memory 120 and/or instructions stored in a memory disposed in the processor, to perform various function applications of the terminal device 100 and data processing.

A wireless communication function of the terminal device 100 may be implemented by using the radio frequency circuit 140, the mobile communication module 150, the wireless communication module 160, the modem processor, the baseband processor, and the like.

The radio frequency circuit 140 may include at least one antenna 141 to transmit and receive an electromagnetic wave signal. Each antenna in the terminal device 100 may be configured to cover one or more communication frequency bands. In some embodiments, the antenna may be used in combination with a tuning switch.

The mobile communication module 150 may provide a wireless communication solution that is applied to the terminal device 100 and that is used for 2G, 3G, 4G, 5G and the like. The mobile communication module 150 may include at least one filter, a switch, a power amplifier, a low noise amplifier (low noise amplifier, LNA), and the like. The mobile communication module 150 may receive an electromagnetic wave by using an antenna 141, perform processing such as filtering and amplification on the received electromagnetic wave, and transmit a signal to a modem processor for demodulation. The mobile communication module 150 may further amplify the signal modulated by the modem processor, and convert the signal into an electromagnetic wave by using the antenna 141 for radiation. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which includes but is not limited to a speaker, a receiver, or the like), or displays an image or a video on the display screen 180. In some embodiments, the modem processor may be an independent component. In some other embodiments, the modem processor may be independent of the processor no, and is disposed in a same device as the mobile communication module 150 or another functional module.

The wireless communication module 160 may include a wireless fidelity (wireless fidelity, Wi-Fi) module, a Bluetooth (Bluetooth, BT) module, a GNSS module, a near field wireless communication (near field communication, NFC) module, an infrared (infrared, IR) module, and the like. The wireless communication module 160 may be one or more components where at least one of the foregoing modules is integrated. The wireless communication module 160 receives an electromagnetic wave by using the antenna 141, performs frequency modulation and filtering processing on an electromagnetic wave signal, and sends a processed signal to the processor 110. The wireless communication module 160 may further receive from the processor 110 a signal to be sent, perform frequency modulation and amplification on the signal, and the antenna 141 converts a modulated and amplified signal into an electromagnetic wave and radiates the electromagnetic wave.

In this embodiment of this application, the wireless communication functions of the terminal device wo may include functions of a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), 5th generation mobile communication new radio (5th generation mobile network new radio, 5G NR), BT, GNSS, WLAN, NFC, FM, and/or IR. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The camera 170 is configured to capture a static image or a video. The camera 170 includes a lens and a photosensitive element. An optical image of an object is generated by using the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, such as RGB, YUV, or RYYB. In some embodiments, the terminal device wo may include one or N cameras 170, where N is a positive integer greater than 1.

The NPU is a neural-network (neural-network, NN) computing processor. The NPU quickly processes input information based on a structure of a biological neural network, for example, based on a transfer mode between human brain neurons; and may further continuously perform self-learning. Applications such as intelligent cognition of the terminal device 100, for example, image recognition, facial recognition, speech recognition, and text understanding, may be implemented by using the NPU.

The display screen 180 is configured to display an image, a video, and the like. The display screen 180 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the terminal device 100 may include one or N display screens 180, where N is a positive integer greater than 1.

The touch sensor 190 is also referred to as a "touch component". The touch sensor 190 may be disposed on the display screen 180, and the touch sensor 190 and the display screen 180 form a touchscreen, which is also referred to as a "touch screen". The touch sensor 190 is configured to detect a touch operation performed on or near the touch sensor. The touch sensor may transfer the detected touch operation to the application processor to determine a type of the touch event. A visual output related to the touch operation may be provided through the display screen 180. In some other embodiments, the touch sensor 190 may alternatively be disposed on a surface of the terminal device 100 at a location different from a location of the display screen 180.

The barometric pressure sensor 210 is configured to measure barometric pressure. In some embodiments, the terminal device 100 calculates an altitude by using a barometric pressure value measured by the barometric pressure sensor 210, to assist in positioning and navigation.

The button 220 includes a power button, a volume button, and the like. The button 220 may be a mechanical button, or may be a touch key. The terminal device 100 may receive a button input, and generate a button signal input related to a user setting and function control of the terminal device 100.

It can be understood that the structure illustrated in this embodiment of this application does not impose a specific limitation on the terminal device 100. In some other embodiments of this application, the terminal device may include more or fewer components than those shown in the figure, or some components may be combined, or some components may be split, or a different component arrangement may be used. The components shown in the figure may be implemented in hardware, software, or a combination of software and hardware.

In the distributed scenario shown in FIG. 2, any terminal device may be used as a server device or a client device in real-time streaming transmission and playing. Whether a terminal device is specifically a server device or a client device depends on whether the terminal device is a media resource provider or a media resource player. For example, for a terminal device A and a terminal device B, if the terminal device A plays a media file in the terminal device B across devices, the terminal device A is a client device, and the terminal device B is a server device. On the contrary, if the terminal device B plays a media file in the terminal device A across devices, the terminal device B is a client device, and the terminal device A is a server device.

Method steps of the media playing method provided in this embodiment of this application may be implemented in a client device and a server device, and are mainly implemented in a client device. An embodiment of this application further provides a software architecture of a terminal device. The software architecture may be used by the client device and the server device to implement the method steps of the media playing method.

Figure 8:
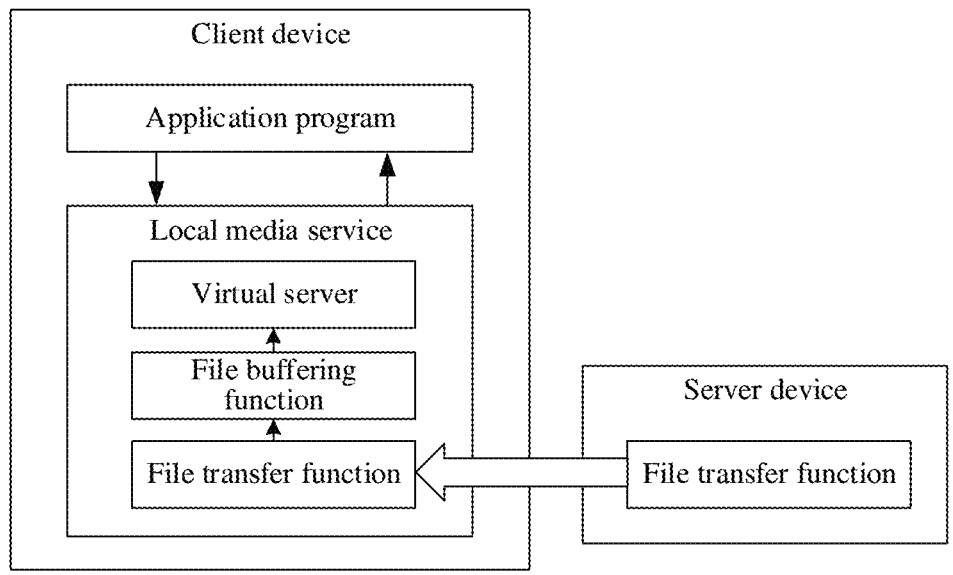
FIG. 8 is a schematic diagram of a software architecture according to an embodiment of this application.

FIG. 8 is a schematic diagram of a software architecture according to an embodiment of this application. As shown in FIG. 8, the software architecture includes a client part and a server part. The client part may include an application program and a local media service (which may also be referred to as a media proxy service, a local proxy service, or the like, and this is not limited in this embodiment of this application), and the server part may include a file management function.

The application program usually may be an application program, for example, a file manager application, a player application, or another media application having a file browsing and playing function. This is not limited in this embodiment of this application. The application program may be a system application of the client device, or may be a third-party application. This is not limited in this embodiment of this application.

The local media service is a functional module newly added to the client device in this embodiment of this application. The local media service may include, for example, a virtual server, a file buffering function, and a file transfer function. The local media service may be considered as a proxy service disposed between the application program and the server device, isolates an original streaming media transmission behavior from the server device to the application program, receives and buffers a media resource from the server device, and provides a media resource access function for the application program. A specific function of the local media service is further described in the following embodiments.

The file management function of the server device is required to implement only a common file storage and transfer function. Therefore, no service related to a real-time streaming protocol needs to be deployed in the server device.

Figure 9:
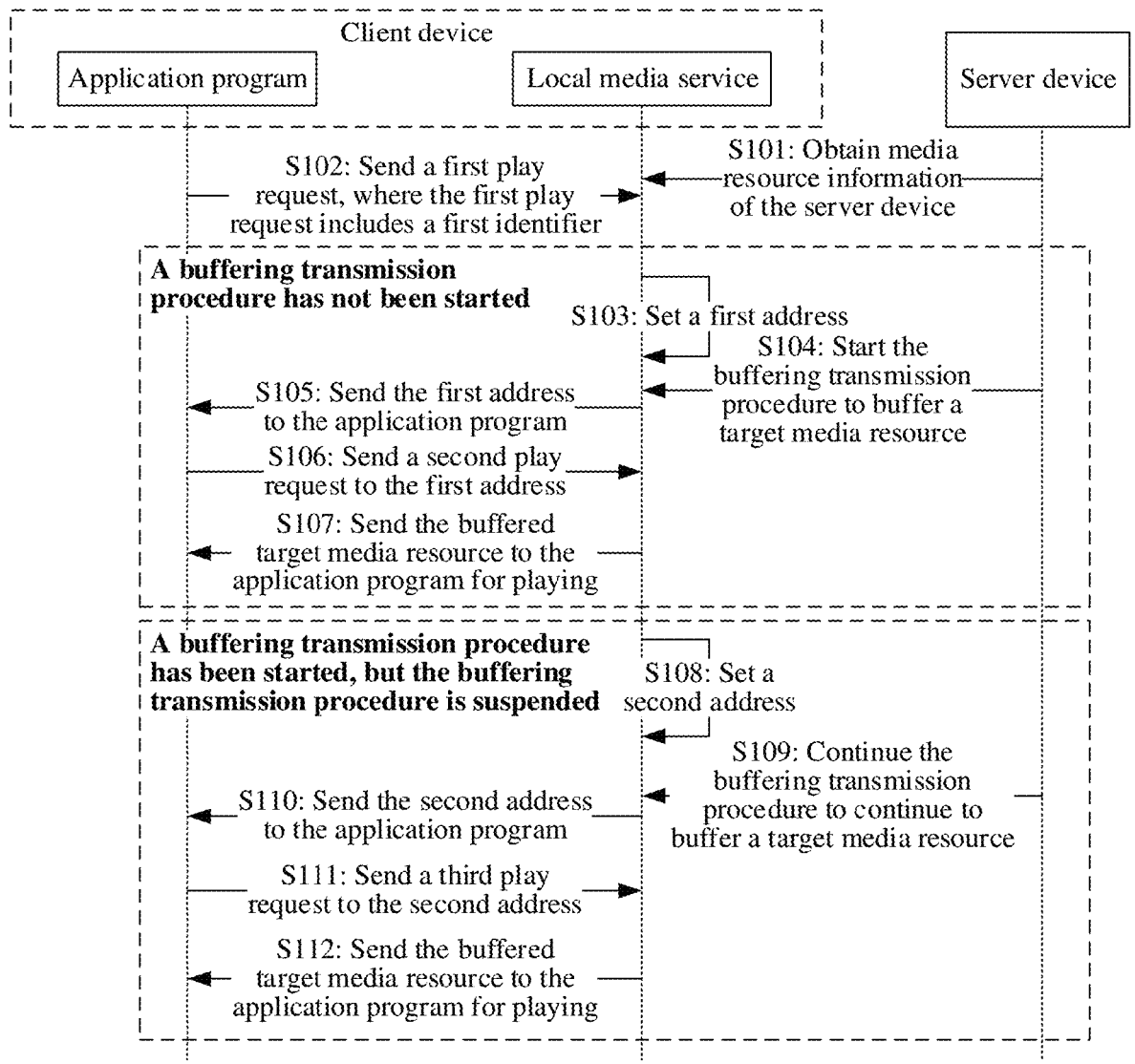
FIG. 9 is a flowchart of a media playing method according to an embodiment of this application.

FIG. 9 is a flowchart of a media playing method according to an embodiment of this application. The method is applicable to a client device having the software architecture shown in FIG. 8. As shown in FIG. 9, the method may include the following steps:

Step S101: A local media service obtains media resource information of a server device.

For example, the media resource information of the server device may include a file identifier of a media resource stored in the server device. In the server device, each media file has one file identifier, and different media files have different file identifiers. Therefore, the file identifier may be used by the client device and the server device to identify a unique identity of a specific media file.

In an implementation, the file identifier may be a file descriptor (file descriptor, FD), a form of the file identifier may be a non-negative integer, and the file identifier may be generated when the server device creates a media file. This is not limited in this embodiment of this application.

In an implementation, the file identifier may be a path of the media file, for example, an HTTP path of an audio file in a local area network in a distributed scenario. This is not limited in this embodiment of this application.

It may be understood that, in addition to the FD and the path shown above, the file identifier may further include a file identifier in another form, and details are not described herein.

In an implementation, the media resource information may further include one or more of a file name, a file type, a file size, a thumbnail, or creation time that are of each media file.

It should be additionally noted herein that, in this embodiment of this application, step S101, to be specific, an action of obtaining the media resource information of the server device by the local media service may be triggered in a plurality of manners. This is not limited in this embodiment of this application, as long as an application program can obtain the media resource information before triggering a first application request. For example, during running of the local media service, the local media service may periodically obtain the media resource information of the server device. Alternatively, when detecting that the media resource information changes (for example, a file is added, a file is deleted, or a file attribute changes), the server device actively sends the latest media resource information to the local media service. Alternatively, the local media service may trigger, when the application program is started, a behavior of obtaining the media resource information of the server device.

Step S102: The application program sends a first play request to the local media service, where the first play request includes a first identifier.

The following specifically describes an implementation of step S102 with reference to one application scenario.

Figure 10A:
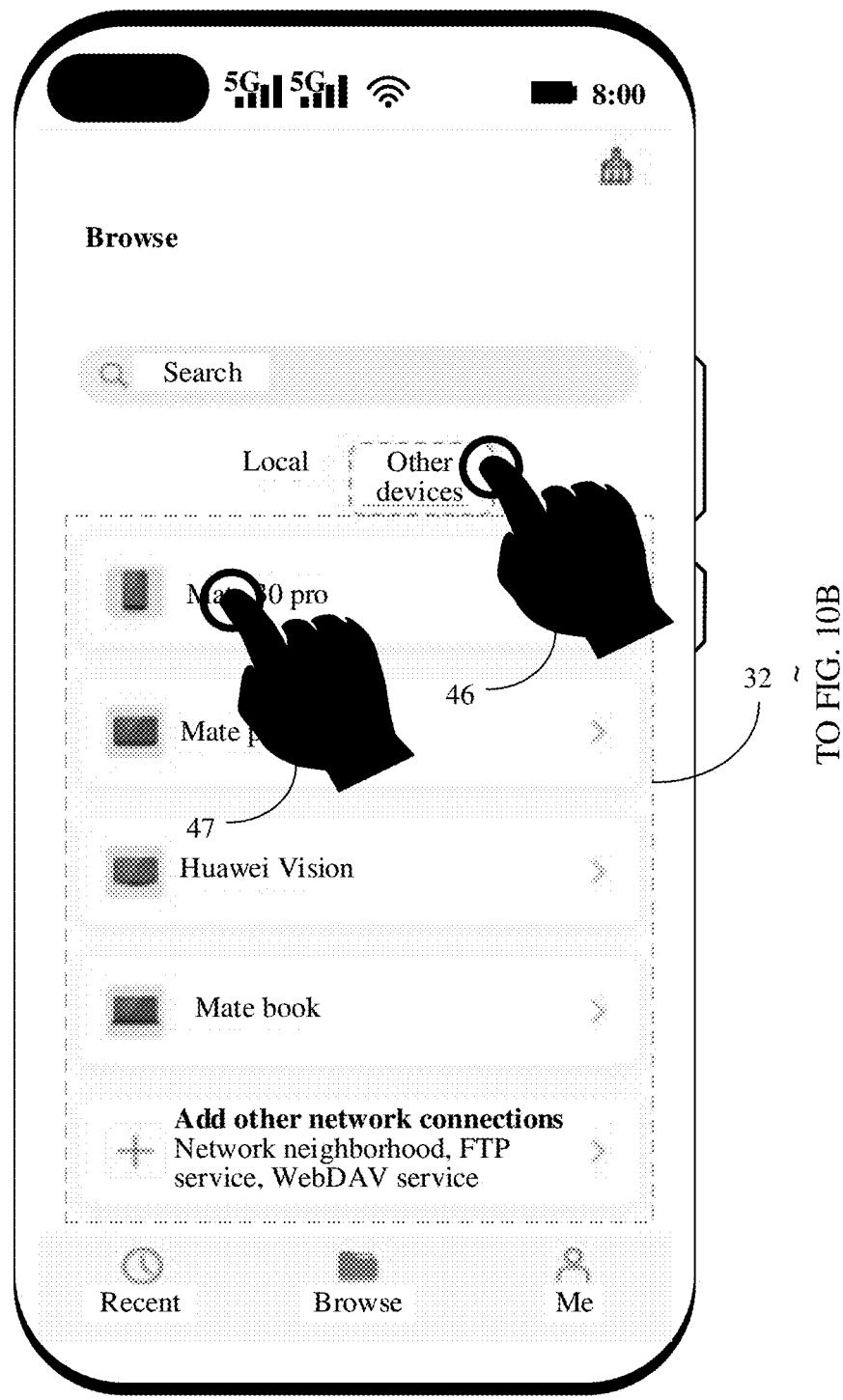
FIG. 10A and FIG. 10B are a diagram of a scenario in which an application program generates a first play request according to an embodiment of this application.
Figure 10B:
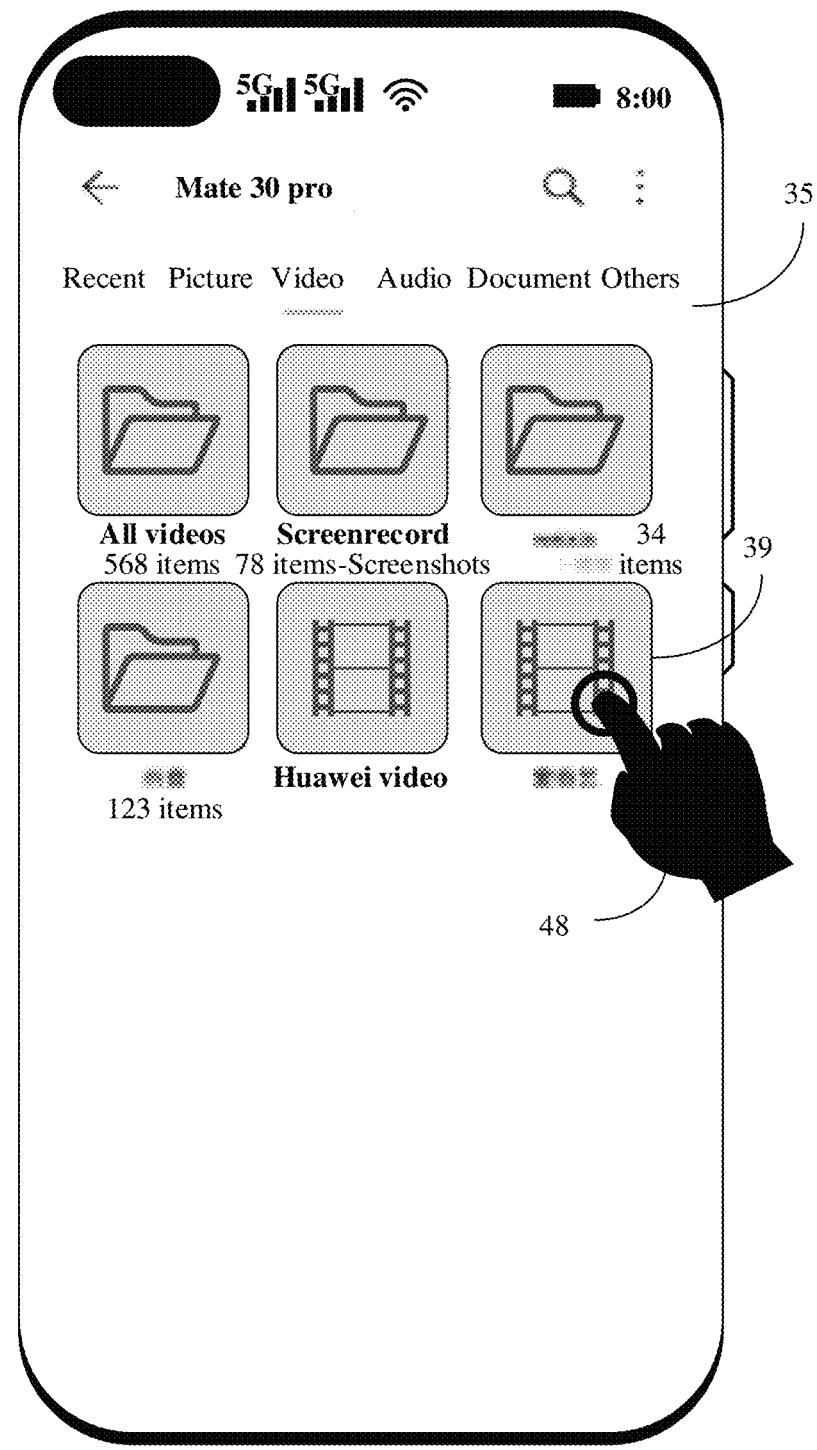

FIG. 10A and FIG. 10B are a diagram of a scenario in which an application program generates a first play request according to an embodiment of this application.

As shown in FIG. 10A and FIG. 10B, when a file management application in a client device is opened, and an option "others" is tapped 46, the file management application may present a server device list 32 to a user.

Next, if the user expects to access a media resource in a specific server device, the user may tap the server device. When detecting that the user taps 47 the specific server device, the application program may obtain media resource information of the server device from a local media service, and generate a media resource page 35 of the server device based on the media resource information.

Next, if the user expects to play a specific media resource (which is referred to as a target media resource below), the user may tap 48 an icon 39 of the target media resource. When detecting that the user taps 48 the icon 39 of the target media resource, the application program sends the first play request to the local media service. It may be understood that a first identifier in the first play request is a media identifier of the target media resource.

It should be additionally noted herein that, in addition to generating the first play request in response to touch input by the user, the application program may alternatively generate the first play request in another manner, for example, in response to voice input by the user or in response to input of a remote control. This is not limited in this embodiment of this application.

In an implementation, communication between the application program and the local media service may be implemented by a virtual server in the local media service. The virtual server may be, for example, an HTTP virtual server. In this way, message and data transmission may be established between the application program and the HTTP virtual server based on an HTTP protocol.

During specific implementation, the HTTP virtual server may listen to a request of the application program on a local IP address and a specific port. The port may be pre-agreed by the application program and the local media service. For example, the local IP address usually may be 127.0.0.1, and the port may be any one or more of 1 to 65536. For ease of description, the port is represented by using xx below. Correspondingly, the first play request may be an HTTP request sent to 127.0.0.1:xx. In this way, the local media service can receive the first play request by listening to 127.0.0.1:xx.

In this embodiment of this application, after receiving the first identifier, the local media service may first determine whether the local media service has started a buffering transmission procedure of the target media resource corresponding to the first identifier. If the local media service has not started the buffering transmission procedure, it indicates that the application program has not played the target media resource before, and the application program sends the first play request to the local media service for the first time. In this case, the local media service and the application program may perform steps S103 to S107.

It should be additionally noted herein that, in this embodiment of this application, "the buffering transmission procedure has not been started" means that the local media service does not start a procedure of transmitting the target media resource from the server device to the client device, and in this case, the client device does not buffer any file fragment of the target media resource locally. This status usually corresponds to a scenario in which the user requests to play the target media resource for the first time.

Step S103: The local media service sets a first address.

The first address may be an address that is of the client device and that is used for accessing the buffered target media resource, and may be used by the application program to subsequently obtain a media stream corresponding to the target media resource.

In an implementation, the first address may be a local uniform resource locator URL address. If the message and data transmission is established between the application program and the virtual server based on the HTTP protocol, the first address is also an HTTP address, for example, http://127.0.0.1:xx/y, where y indicates a file path of the target media resource to be buffered in the client device.

Step S104: The local media service starts the buffering transmission procedure to buffer the target media resource of the server device to the client device.

Step S105: The local media service sends the first address to the application program, and the application program receives the first address.

During specific implementation, step S105 may be performed by a virtual server of the local media service. When the virtual server is an HTTP virtual server, the HTTP virtual server may send the first address to the application program by using an HTTP protocol message.

During specific implementation, step S104 and step S105 may be synchronously performed, or step S105 may be performed before step S104, or step S105 may be performed after step S104. This means that when sending the first address to the application program, the local media service may already start to buffer the target media resource, but at this time, the application program has not received a request of the user to start playing a media resource. It can be learned that, in this embodiment of this application, a buffering process and a playing process that are of a media resource are independent of each other and decoupled from each other, and the buffering process of the media resource may be performed before the playing process of the media resource.

In an implementation, step S105 may be implemented by using a file buffering function and a file transfer function that are of the local media service. During specific implementation, the file buffering function may first obtain a storage location of the target media resource based on a distributed file system formed between the client device and the server device. The storage location may also be a URL.

The distributed scenario shown in FIG. 2 is used as an example. It is assumed that a local area network IP address of the client device in the distributed scenario is 192.168.1.105, a local area network IP address of the server device is 192.168.1.107, and a storage path of the target media resource in the server device is a/b/c. In this case, when an ftp protocol (which is merely used as an example, another protocol may alternatively be used, and this is not limited herein) is used between the server device and the client device for data transmission, the storage location of the target media resource maybe: ftp://192.168.1.107/a/b/c.

Next, the file buffering function may determine a buffering policy based on some set policy factors. The policy factors that may be used herein may include but are not limited to one or more of the following: a network capability of the server device, a network capability of the client device, a protocol rate between the server device and the client device, disk I/O performance of the server device, disk I/O performance of the client device, disk I/O load of the server device, disk I/O load of the client device, processor load of the server device, processor load of the client device, and the like.

In addition, the buffering policy that may be used herein may include but is not limited to one or more of the following: a buffering speed, a size of each file fragment when file fragment transmission is used, buffer health buffer health (which refers to a time difference between a progress that has been buffered and a progress that has been played by the application program), and the like.

A relationship between the policy factor and the buffering policy is not specifically limited in this embodiment of this application, and a person skilled in the art may properly determine the relationship based on knowledge in the aft. For example, a higher network capability of the server device and a higher network capability of the client device indicate a faster buffering speed, a larger file fragment, and smaller buffer health; and a lower network capability of the server device and a lower network capability of the client device indicate a smaller file fragment and larger buffer health.

Next, the file buffering function may start cross-device transmission of the target media resource according to the buffering policy, for example, obtain the target media resource from the storage location of the target media resource based on a determined buffering speed, and buffer the target media resource in the first address by fragment until a buffered target media resource meets a buffer health requirement.

Step S106: The application program sends a second play request to the first address.

The second play request may be a request that the user expects to start playing the media resource.

Figure 11:
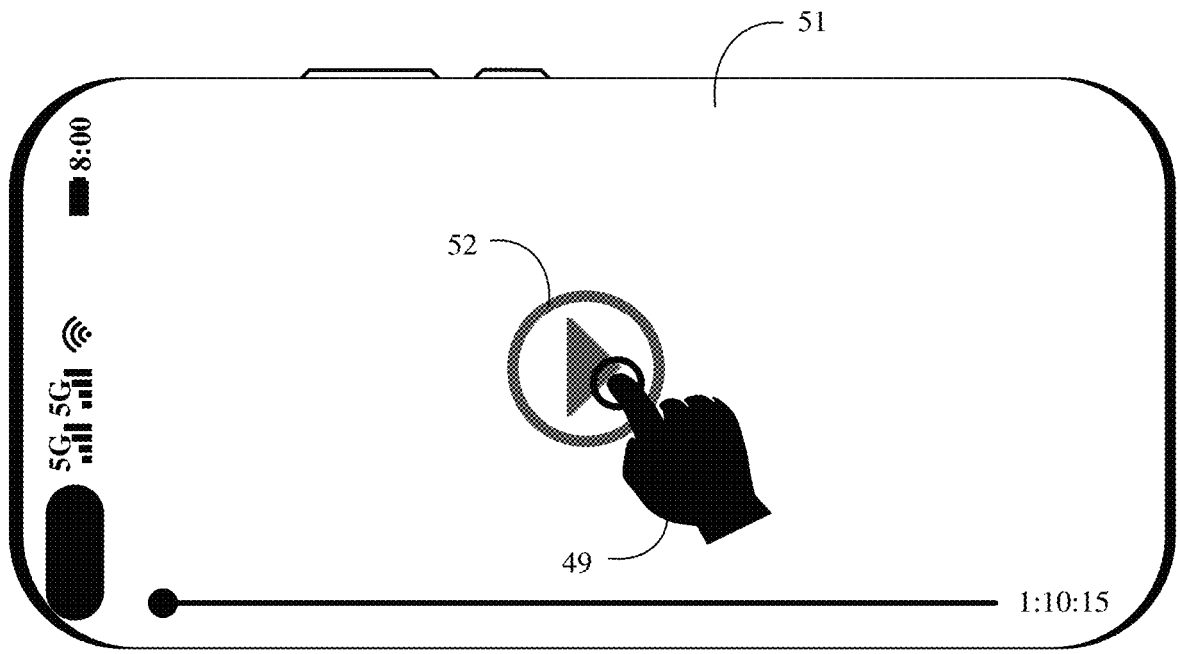
FIG. 11 is a diagram of a scenario in which an application program generates a second play request according to an embodiment of this application.

FIG. 11 is a diagram of a scenario in which an application program generates a second play request according to an embodiment of this application.

The scenario shown in FIG. 11 may be a continuation of the scenario shown in FIG. 10A and FIG. 10B. As shown in FIG. 11, when a user expects to play a target media resource, and taps an icon of the target media resource, the application program may enter a playing interface 51 of the target media resource. On the playing interface 51, the application program may start to play the target media resource in at least two manners: One manner is "no autoplay", and the other manner is "autoplay". The "no autoplay" and "autoplay" modes may be selected and set by the application program by default, or may be set by the user.

In the "no autoplay" manner, the playing interface 51 may include a play start button 52. When detecting that the user taps 49 the play start button 52, the application program starts playing. In this case, if the application program uses the "no autoplay" manner, the application program may send the second play request to a first address when detecting that the user 49 taps the play start button 52.

In the "autoplay" manner, when detecting that the user taps the icon of the target media resource, the application program enters the playing interface 51 of the target media resource and directly starts playing. In this case, if the application program uses the "autoplay" manner, after detecting that the user taps the icon of the target media resource, the application program may immediately send the second play request to the first address as long as the first address is obtained. If the application program plays the target media resource for the first time, and the application program may not obtain the first address in advance, the application program may send the second play request to the first address immediately after a local media service feeds back the first address. If the application program does not play the target media resource for the first time, and the application program may have obtained the first address during previous playing, the application program may immediately send the second play request to the first address.

In an implementation, the second play request may be an HI IP request, the request may be sent to a first port of the first address, and the first port may be a port pre-agreed by the application program and the local media service. The application program and the local media service may agree on a same port for the first play request and the second play request, or may agree on different ports for the first play request and the second play request. This is not limited in this embodiment of this application.

Step S107: When receiving the second play request, the local media service sends the buffered target media resource to the application program for playing.

During specific implementation, step S107 may be performed by a virtual server of the local media service. The virtual server may be, for example, an HTTP virtual server. The virtual server may create a server socket ServerSocket for a local IP address and the first port, listen to, by using the ServerSocket, an HTTP request received on the first port of the local IP address, and if obtaining the second play request through listening, send the buffered target media resource to the application program for playing.

In an implementation, that the local media service sends the buffered target media resource to the application program for playing may be specifically implemented in the following manner: After obtaining the second play request through listening, the local media service may read, from the first address, a file fragment of the target media resource buffered by fragment, process the file fragment into a media stream based on an audio/video time sequence corresponding to the file fragment, and then send the media stream to the application program for playing. The media stream may be a media stream based on an HTTP protocol, and is sent to the application program by using an HTTP response message.

Further, after receiving the media stream, the application program may decode and render the media stream by using an audio/video decoder, a renderer, and the like that are configured by the application program, to generate a sound or an image.

It can be learned from the foregoing technical solutions that, in the media playing method provided in this embodiment of this application, the local media service is built on the client. When the application program requests to play the media resource of the server device, the client device may first buffer the media resource locally by using the local media service, so that the application program can directly request the local media service to obtain the media resource locally and play the media resource. In this way, the server device only needs to provide a common file transfer function for the client device, and does not participate in or perceive a playing process. Therefore, a playing-related service does not need to be deployed, which lowers a capability requirement on the server device, and implements cross-device real-time media playing between thin devices.

It may be understood that, in a scenario of cross-device real-time media playing, for a same target media resource in the server device, the application program may play the media resource for the first time, or may not play the media resource for the first time. This depends on willingness of the user. When the application program plays the target media resource for the first time, the local media service has not started a buffering transmission procedure. Therefore, the client device may completely perform the method in steps S101 to S107. When the application program does not play the target media resource for the first time, the local media service may have started the buffering transmission procedure in a previous playing process. In this case, the client may further perform another method step based on a buffering status of the target media resource.

Specifically, in the scenario of cross-device real-time media playing, the user may perform a play control operation such as "start playing", "pause playing", or "terminate playing", or repeatedly play the target media resource. In this case, the target media resource may have different buffering statuses. A "playing starting" scenario is used as an example. A buffering status of the target media resource may include "a buffering transmission procedure has not been started" and "a buffering transmission procedure has been started". The "a buffering transmission procedure has been started" may further include statuses such as "buffering transmission is suspended", "buffering transmission is being performed", and "buffering transmission is completed".

The "buffering transmission is suspended" means that the local media service has started a procedure of transmitting the target media resource from the server device to the client device before, but the transmission procedure is suspended for some reasons (for example, the user taps to pause playing or temporarily close the playing). However, a connection between the server device and the local media service for transmitting the target media resource and a pre-applied system resource are not released. In this case, the local media service has recorded a buffering location of the target media resource on the client, an overall length of the target media resource, and a current transmitted length (that is, a transmission progress) of the target media resource.

The "buffering transmission is being performed" means that the local media service has started the procedure of transmitting the target media resource from the server device to the client device before, and is performing data transmission. This status usually corresponds to that the user is playing the target media resource or pauses playing the target media resource, but a buffering action of the target media resource is still being performed for some reasons (for example, the buffered target media resource does not meet a buffer health requirement).

The "buffering transmission is completed" means that cross-device transmission of the target media resource is completed, and the client device has completely buffered each file fragment of the target media resource.

Further, as shown in FIG. 9, when the local media service has started the buffering transmission procedure, but the buffering transmission procedure is suspended, the local media service and the application program may perform the following steps S108 to S112 after step S102.

Step S108: The local media service sets a second address.

The second address may be an address that is of the client device and that is used for accessing the buffered target media resource, and the second address may be the same as or different from the first address. When both the first address and the second address are HTTP addresses, a difference between the first address and the second address may be only that ports are different. For example, the first address may include a local IP address and a first port, and the second address may include a local IP address and a second port.

It should be additionally noted herein that, the first address and the second address each may be a temporary address, and each time the local media service receives a first play request, such a temporary address may be generated, so that the application program subsequently obtains, from the temporary address, a media stream corresponding to a target media resource.

Step S109: The local media service continues the buffering transmission procedure, to continue to buffer the target media resource from the server device to the client device based on a buffering progress of the target media resource.

Step S110: The local media service sends the second address to the application program, and the application program receives the second address.

Step S111: The application program sends a third play request to the second address.

The third play request may be a request that the user expects to resume playing the media resource.

Step S112: When receiving the third play request, the local media service sends the buffered target media resource to the application program for playing.

During specific implementation, step S112 may be performed by a virtual server of the local media service. The virtual server may be, for example, an HTTP virtual server. The virtual server may create a server socket ServerSocket for the local IP address and the second port, listen to, by using the ServerSocket, an HTTP request received on the second port of the local IP address, and if obtaining the third play request through listening, send the buffered target media resource to the application program for playing.

Figure 12:
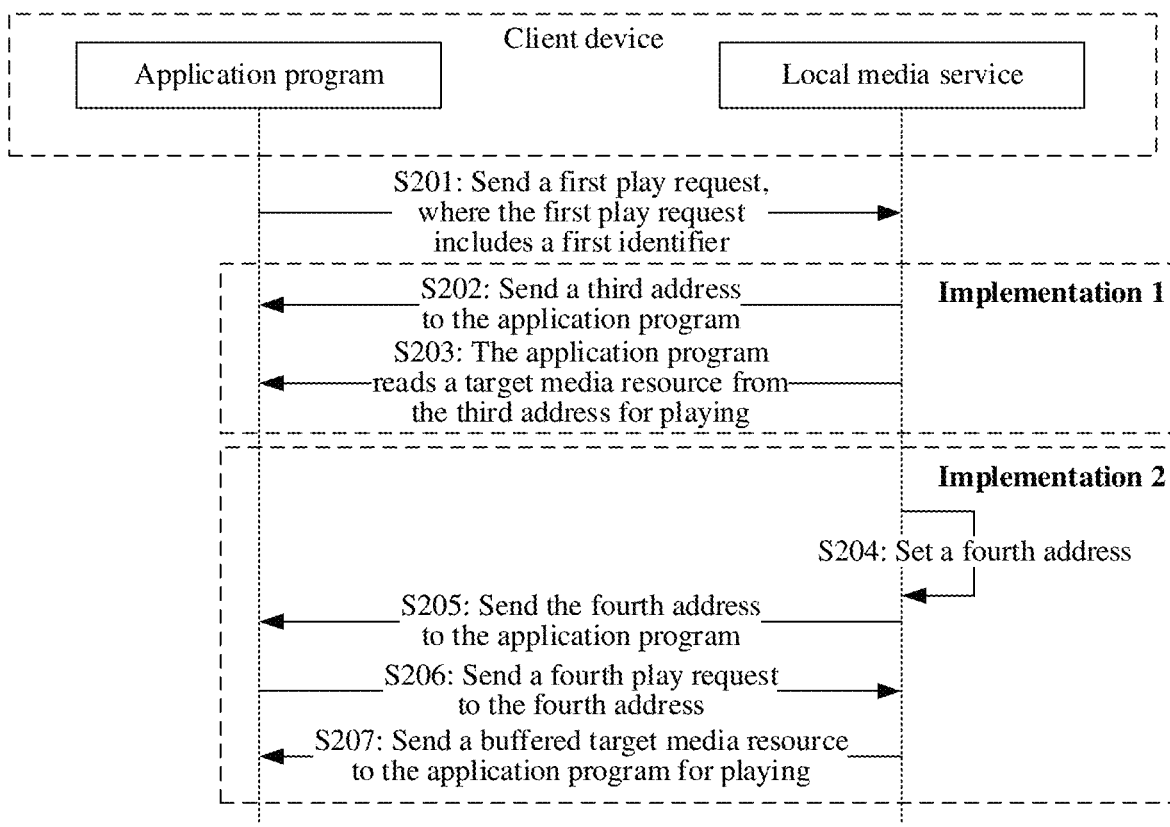
FIG. 12 is a flowchart of another media playing method according to an embodiment of this application.

FIG. 12 is a flowchart of another media playing method according to an embodiment of this application. The method is applicable to a case in which a local media service has buffered a target media resource locally.

In an implementation, as shown in FIG. 12, the method may include the following steps 201 to S203.

Step S201: An application program sends a first play request to a first address.

Step S202: The local media service sends a third address to the application program in response to the first play request.

The third address may be a file path of the locally buffered target media resource.

The following describes a difference between the first address and the third address. The first address is a local URL address, and includes a local IP address, a port http://127.0.0.1:xx, and a file path y of the target media resource buffered in a client device. The difference from the first address is that after the target media resource is buffered, the local media service does not need to transmit data from a server device, the target media resource does not need to be occupied by an HTTP virtual server, and the target media resource may no longer use a URL address. Therefore, the third address may directly be the file path y of the target media resource buffered in the client device.

For example, y may be in the following form: Storage (which is a root directory of the client device)/Movies/ShareMedia/1.mov.

Step S203: The application program reads the target media resource from the third address for playing.

The application program may access a target media resource file, for example, 1.mov at the third address, and play the file. This process is the same as that of playing local media by the application program, and does not involve a streaming transmission process.

In another implementation, as shown in FIG. 12, the method may include the following steps 201 and S204 to S207.

Step S201: An application program sends a first play request to a first address.

Step S204: The local media service sets a fourth address.

The second address may be an address that is of a client device and that is used for access the buffered target media resource, and the fourth address may be the same as or different from the first address and the second address. When the first address, the second address, and the fourth address are all HTTP addresses, a difference between the first address, the second address, and the fourth address may be only that ports are different. For example, the first address may include a local IP address and a first port, the second address may include a local IP address and a second port, and the fourth address may include a local IP address and a fourth port.

Step S205: The local media service sends the fourth address to the application program, and the application program receives the fourth address.

Step S206: The application program sends a fourth play request to the fourth address.

The fourth play request may be a request that a user expects to resume playing the media resource.

Step S207: When receiving a third play request or the fourth play request, the local media service sends the buffered target media resource to the application program for playing.

During specific implementation, step S207 may be performed by a virtual server of the local media service. The virtual server may be, for example, an HTTP virtual server. The virtual server may create a server socket ServerSocket for the local IP address and the fourth port, listen to, by using the ServerSocket, an HTTP request received on the fourth port of the local IP address, and if obtaining the fourth play request through listening, send the buffered target media resource to the application program for playing.

Figure 13:
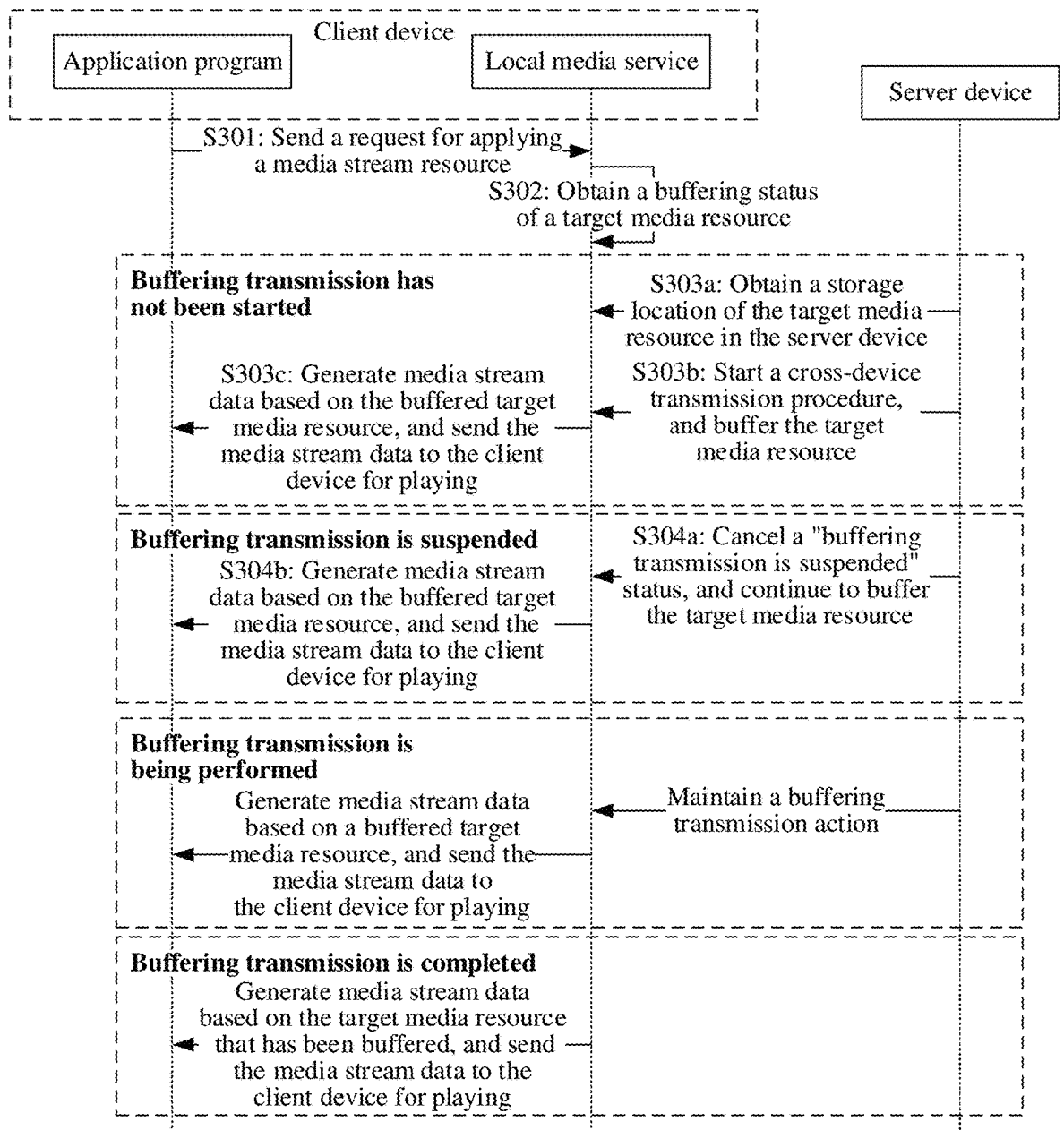
FIG. 13 is a processing flowchart of a local media service in a playing starting scenario according to an embodiment of this application.

FIG. 13 is a complete processing flowchart of a local media service in a playing starting scenario according to an embodiment of this application. As shown in FIG. 13, the complete processing procedure may include, for example, the following steps.

Step S301: An application program sends, to the local media service, a request for applying for a media stream resource corresponding to a target media resource.

In an implementation, when the application program detects that a user taps an icon of the target media resource on a media resource page, the application program sends a play request to the local media service, where the request is the request for applying for the media stream resource.

In an implementation, when the application program detects that the user taps a resume play button in a playing pause status of the target media resource, the application program sends a resume play request to the local media service, where the request is the request for applying for the media stream resource.

Step S302: The local media service obtains a buffering status of the target media resource based on the request of the application program.

Based on different buffering statuses, the local media service may then perform different processing procedures.

In a "buffering transmission has not been started" status, the local media service may perform the following steps:

Step S303a: The local media service obtains a storage location of the target media resource in a server device.

Step S303b: The local media service starts a cross-device transmission procedure, and buffers the target media resource.

In the cross-device transmission process of the target media resource, the local media service is responsible for updating and managing, in real time, each file fragment of the target media resource buffered in a client device.

Step S303c: The local media service generates media stream data based on the buffered target media resource, and sends the media stream data to the client device for playing.

In a "buffering transmission is suspended" status, the local media service may perform the following steps.

Step S304a: The local media service cancels the "buffering transmission is suspended" status, and continues to buffer the target media resource.

During specific implementation, the local media service may continue to buffer the target media resource in an incremental transmission manner based on a buffering progress of the target media resource, to avoid repeated transmission of the target media resource that has been buffered. In the cross-device transmission process of the target media resource, the local media service is responsible for updating and managing, in real time, each file fragment of the target media resource buffered in a client device.

Step S304b: The local media service generates media stream data based on the buffered target media resource, and sends the media stream data to the client device for playing.

If step S301 is triggered when the user taps the resume play button in the playing pause status of the target media resource, the local media service may select a file fragment of corresponding time based on a previous playing progress of the target media resource to generate a media stream. For example, when last playing of the target media resource reaches 10 minutes and 20 seconds, and if the user taps "resume playing", the local media service may start to generate a media stream from a file fragment corresponding to 10 minutes and 20 seconds.

In some implementations, the application program allows, when the target media resource is not played for the first time, the user to select whether to "resume playing from a progress of last playing" or "play from the beginning". If the user selects "resume playing from a progress of last playing", the local media service may immediately start to continue to buffer the target media resource from the server device, and select the file fragment of the corresponding time based on the previous playing progress of the target media resource to generate the media stream. If the user selects "play from the beginning", the local media service may not continue to buffer the target media resource from the server device, but generate a media stream of the target media resource from the beginning, and start to buffer the target media resource when buffer health is insufficient.

In a "buffering transmission is being performed" status, the local media service may maintain a current buffering transmission action, generate media stream data based on the target media resource that has been buffered, and send the media stream data to the client device for playing.

In a "buffering transmission is completed" status, the local media service may directly generate media stream data based on the target media resource that has been buffered, and send the media stream data to the client device for playing, and does not need to re-buffer the target media resource from the server device.

According to the foregoing solutions, in a "playing starting" scenario, the local media service may perform different processing procedures based on different buffering statuses of the target media resource, to implement cross-device incremental transmission and successive buffering of the target media resource, avoid repeated transmission, reduce occupation of a transmission bandwidth between devices, and reduce occupation of storage space of the client device.

Next, a "playing termination" scenario is used as an example. Buffering statuses of the target media resource may also include a "buffering transmission has not been started" status, a "buffering transmission is suspended" status, a "buffering transmission is being performed" status, and a "buffering transmission is completed" status.

Figure 14:
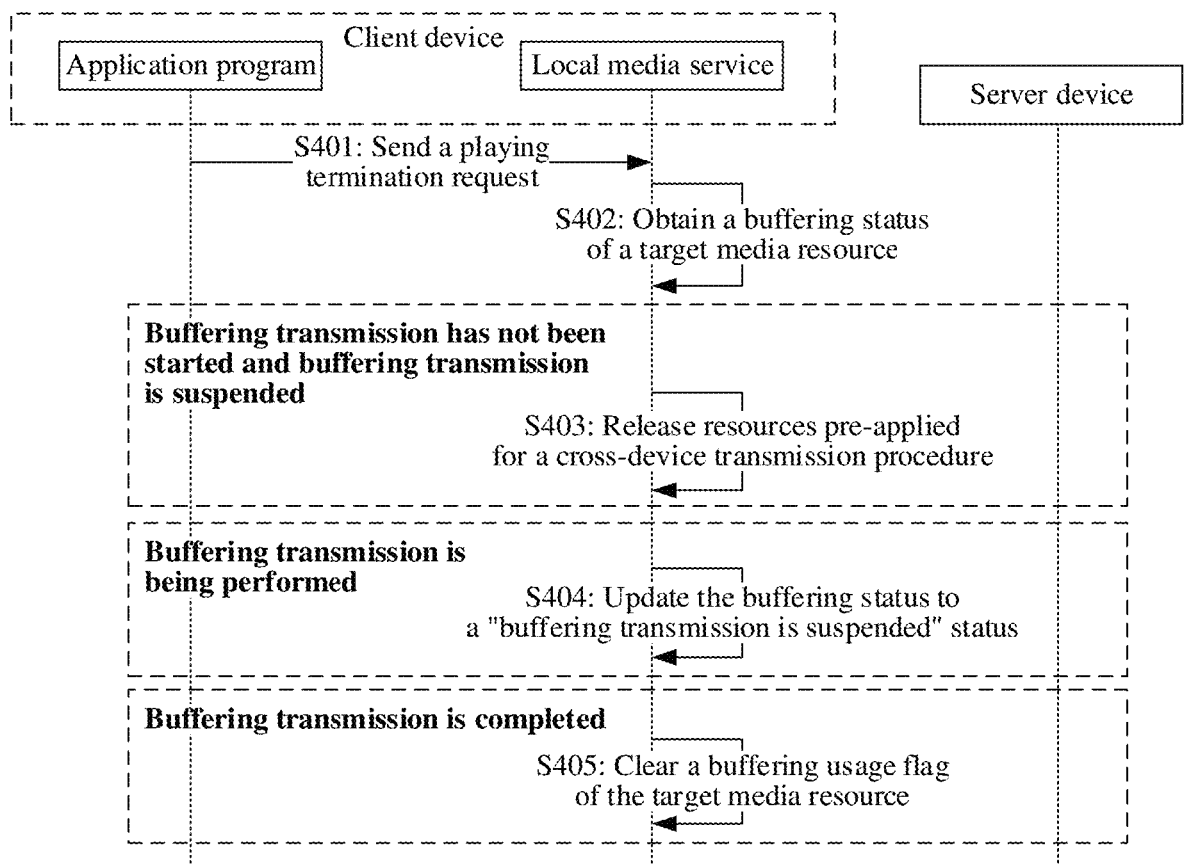
FIG. 14 is a processing flowchart of a local media service in a playing termination scenario according to an embodiment of this application.

FIG. 14 is a processing flowchart of a local media service in a playing termination scenario according to an embodiment of this application. As shown in FIG. 14, the processing procedure may include, for example, the following steps.

Step S401: An application program sends a playing termination request to the local media service.

In an implementation, when the application program detects that a user taps a play stop button or a play pause button, or closes a playing interface, the application program sends the playing termination request to the local media service.

Step S402: The local media service obtains a buffering status of a target media resource based on the request of the application program.

Based on different buffering statuses, the local media service may then perform different processing procedures.

In "buffering transmission has not been started" and "buffering transmission is suspended" statuses, the local media service may perform the following steps.

Step S403: The local media service releases resources pre-applied for a cross-device transmission procedure.

These resources include, for example, storage space pre-allocated for buffering the target media resource, a network resource pre-allocated for transmitting the target media resource, a processor resource pre-allocated for a process related to the local media service.

In a "buffering transmission is being performed" status, the local media service may perform the following step.

Step S404: The local media service updates the buffering status to the "buffering transmission is suspended" status.

In a "buffering transmission is completed" status, the local media service may perform the following step.

Step S405: The local media service clears a buffering usage flag of the target media resource.

The buffering usage flag may identify the buffering status of the target media resource. When the user stops playing and the buffering transmission is completed, the buffering usage flag may be cleared. In this case, the local media service may combine all file fragments of the target media resource into a complete media file for subsequent local playing by the application program.

According to the foregoing solutions, in the "playing termination" scenario, the local media service may perform different processing procedures based on different buffering statuses of the target media resource. For example, the local media service may change the buffering status to facilitate subsequent performing of another playing action by the user, or clear the buffering usage flag to facilitate the subsequent local playing by the application program.

It may be understood that, in addition to implementing cross-device real-time transmission and playing of a media resource, the technical solutions provided in this embodiment of this application may be further used for cross-device transmission of any other data in a distributed scenario, for example, distributed file collaborative editing or distributed file storage. This is not limited in this embodiment of this application.

In the media playing method provided in the foregoing embodiments of this application, the local media service is built on the client, and a process of buffering a media resource and a process of playing the media stream are decoupled by using the local media service, so that the server device does not need to deploy a streaming media service, and does not participate in or perceive a playing process, a capability requirement on the server device is lowered, and cross-device real-time media playing between thin devices is implemented. However, it may be understood that, to achieve the same technical effects as that of the foregoing embodiments, the local media service may alternatively be built on another device, for example, built on a wireless access point on a link between the server device and the client device.

Figure 15:
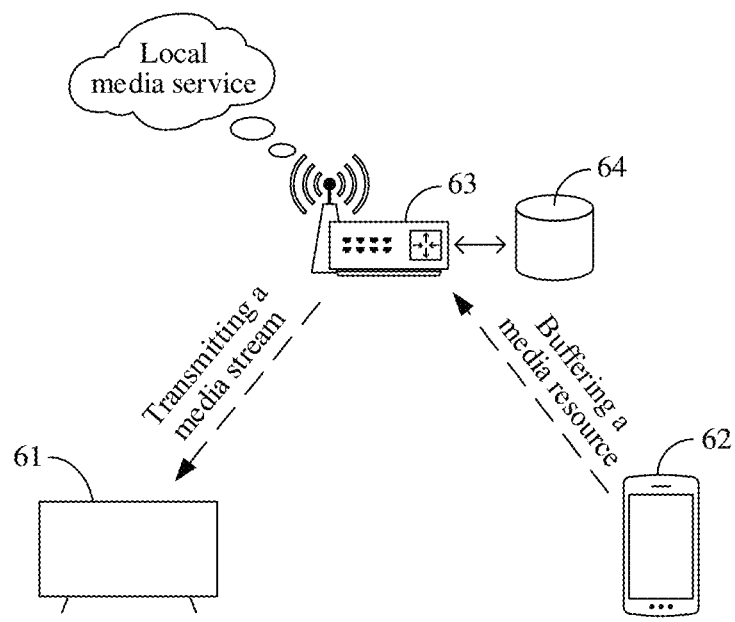
FIG. 15 is a diagram of a hardware architecture of another media playing method according to an embodiment of this application.

FIG. 15 is a diagram of a hardware architecture of another media playing method according to an embodiment of this application. As shown in FIG. 15, a client device 61 and a server device 62 are located in a same local area network by using a router 63. A local media service may be built in the router 63, and corresponds to a local area network address.

When an application program of the client device 61 detects that a target media resource is expected to be played, the application program may send a first play request including a first identifier to the local area network address of the local media service.

Next, the local media service located in the router 63 associates a first address for the first identifier in response to the first play request. In this case, the first address may be one local area network address, for example, http://192.168.1.101:xx/y. xx represents a port, and y represents a file path of the target media resource to be buffered in the router. In an implementation, to implement a media buffering capability, the router may include a built-in or an external memory 64, and the router 63 may allocate a local area network IP address, for example, 192.168.1.101 to the memory 64. It can be learned that the first address may be determined based on the local area network IP address of the memory 64.

Next, the local media service of the router 63 sends the first address to the application program of the client device 61, and starts a procedure of buffering the target media resource to the first address.

Next, the application program of the client device 61 may send a second play request to the first address. When receiving the second play request, the local media service of the router 63 generates a media stream based on the buffered target media resource, and sends the media stream to the application program of the client device 61 for playing.

In the media playing method shown in FIG. 15, the local media service is configured in the router and separated from the client device. In this way, the client device no longer performs procedures of buffering a media resource and generating a media stream, which further lowers a capability requirement on the client device. In addition, because the router usually supports data transmission with a plurality of client devices, the method can implement that the plurality of client devices simultaneously play a media resource of a same server device across devices. For example, when the router is connected to a large-screen display device and a plurality of audio devices, the local media service of the router may send an image stream to the large-screen display device for displaying, and send audio streams to different audio devices based on different audio channels, to achieve a stereo playing effect.

In the foregoing embodiments provided in this application, solutions of the media playing method provided in this application are separately described from a perspective of the client device and interaction between the client device and the server device. It may be understood that, to implement the foregoing functions, each device, for example, the client device and the access point device, includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 16:
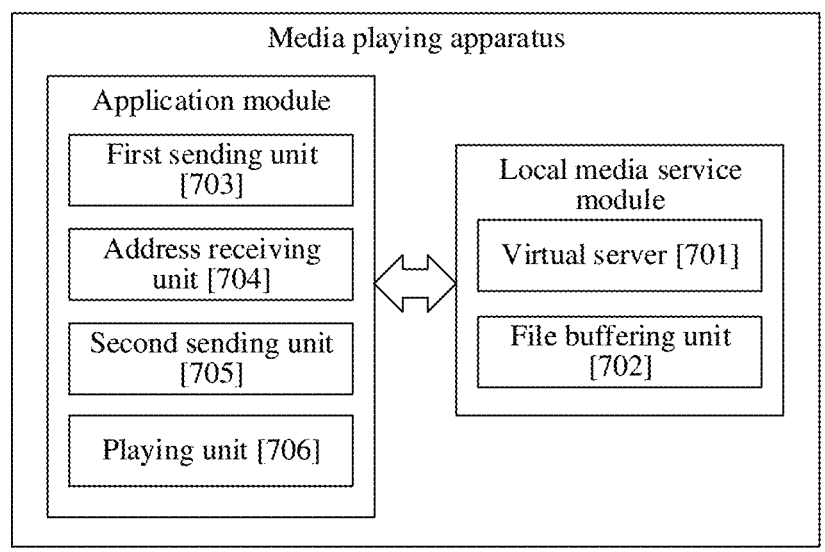
FIG. 16 is a schematic diagram of a structure of a media playing apparatus according to an embodiment of this application.

FIG. 16 is a schematic diagram of a structure of a media playing apparatus according to an embodiment of this application. In an embodiment, a client device may implement a corresponding function by using a software apparatus shown in FIG. 16. As shown in FIG. 16, the media playing apparatus may include: a local media service module and an application module.

The local service module may include: a virtual server 701, configured to receive a first play request of an application program on a client device, where the first play request includes a first identifier, the first identifier corresponds to a target media resource in a server device, and the virtual server 701 is further configured to determine, based on the first identifier, whether a buffering transmission procedure of the target media resource has been started; and a file buffering unit 702, configured to: if the buffering transmission procedure has not been started, start the buffering transmission procedure to buffer the target media resource from the server device to the client device, where the virtual server 701 is further configured to send a first address to the application program, where the first address is a local uniform resource locator URL address that is of the client device and that is used for accessing the buffered target media resource; and the virtual server 701 is further configured to send, when receiving a second play request sent by the application program to the first address, the buffered target media resource to the application program for playing.

In an implementation, the file buffering unit 702 is further configured to: if the buffering transmission procedure has been started but the buffering transmission procedure is suspended, continue the buffering transmission procedure to continue to buffer the target media resource from the server device to the client device based on a buffering progress of the target media resource; the virtual server 701 is further configured to send a second address to the application program, where the second address is a local URL address that is of the client device and that is used for accessing the buffered target media resource; and the virtual server 701 is further configured to send, when receiving a third play request sent by the application program to the second address, the buffered target media resource to the application program for playing.

In an implementation, the virtual server 701 is further configured to: if the target media resource has been completely buffered in the client device, send a third address to the application program, to enable the application program to obtain the target media resource from the third address for playing, where the third address is a file path of the target media resource buffered in the client device.

In an implementation, the virtual server 701 is further configured to: if the target media resource has been completely buffered in the client device, send a fourth address to the application program, where the fourth address is a local URL address that is of the client device and that is used for accessing the buffered target media resource; and the virtual server 701 is further configured to send, when receiving a fourth play request sent by the application program to the fourth address, the buffered target media resource to the application program for playing.

In an implementation, the first address includes a local internet protocol IP address and a first port that are of the client device. The second play request is a hypertext transfer protocol HTTP request.

In an implementation, that the virtual server 701 is configured to send, when receiving a second play request sent by the application program to the first address, the buffered target media resource to the application program includes: the virtual server 701 is configured to listen to the first port of the local IP address; and the virtual server 701 is further configured to generate a first response message when obtaining the second play request through listening, where the first response message is an HTTP response message, and the first response message includes a media stream generated based on the target media resource that has been buffered.

In an implementation, the virtual server 701 is further configured to: when a play stop request of the application program is received, if the buffering transmission procedure is being performed, suspend the buffering transmission procedure, and record the buffering progress of the target media resource.

The application module may include: a first sending unit 703, configured to send a first play request to a media proxy service on a client device, where the first play request includes a first identifier, and the first identifier corresponds to a target media resource in a server device; an address receiving unit 704, configured to receive a destination address sent by the media proxy service; a second sending unit 705, configured to: if the destination address is a local URL address of the client device, send a second play request to the local URL address; and a playing unit 706, configured to receive and play the target media resource that is sent by the media proxy service in response to the second play request, where the target media resource is buffered by the media proxy service from the server device to the client device.

In an implementation, the playing unit 706 is further configured to: if the destination address is a file path address in the client device, obtain the target media resource from the file path address for playing.

In an implementation, the local URL address includes a local IP address and a first port that are of the client device. The second play request is a hypertext transfer protocol HTTP request.

In an implementation, that a second sending unit 705 is configured to send a second play request to the local URL address includes: sending the second play request to the first port of the local IP address.

In an implementation, that a playing unit 706 is configured to receive the target media resource that is sent by the media proxy service in response to the second play request includes: receiving a first response message sent by the media proxy service in response to the second play request, where the first response message is an HTTP response message, and the first response message includes a media stream generated by the media proxy service based on the target media resource that has been buffered.

An embodiment of this application further provides a computer-readable storage medium, where the computer-readable storage medium stores instructions; and when the instructions are run on a computer, the computer is enabled to perform the method according to the foregoing aspects.

An embodiment of this application further provides a computer program product including instructions, where when the computer program product runs on a computer, the computer is enabled to perform the method according to the foregoing aspects.

Figure 17:
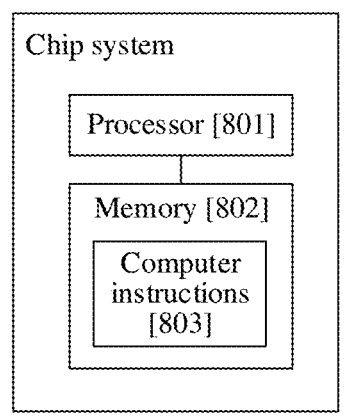
FIG. 17 is a schematic diagram of a structure of a chip system according to an embodiment of this application.

An embodiment of this application further provides a chip system. FIG. 17 is a schematic diagram of a structure of the chip system. The chip system includes a processor 801, configured to support the foregoing apparatus in implementing functions in the foregoing aspects, for example, generating or processing information in the foregoing method. In a possible design, the chip system further includes a memory 802, configured to store computer instructions 803 and data that are necessary for a long-lived connection apparatus. The chip system may include a chip, or may include a chip and another discrete component.

In the foregoing specific implementations, the objectives, technical solutions, and beneficial effects of embodiments of this application are further described in detail. It should be understood that the foregoing descriptions are merely specific implementations of embodiments of this application, but are not intended to limit the protection scope of embodiments of this application. Any modification, equivalent replacement, improvement, or the like made based on the technical solutions in embodiments of this application shall fall within the protection scope of embodiments of this application.

What is claimed is:

1. A method, comprising:

receiving, by a media proxy service on a client device, a first play request of an application program on the client device, wherein the first play request comprises a first identifier, and the first identifier corresponds to a target media resource in a server device;

determining, by the media proxy service and based on the first identifier, whether a buffering transmission procedure of the target media resource has been started;

when the buffering transmission procedure has not been started, starting, by the media proxy service, the buffering transmission procedure;

buffering, from the server device, the target media resource to the client device;

sending a first address to the application program, wherein the first address is a local uniform resource locator (URL) address used for accessing the buffered target media resource;

sending, by the media proxy service when receiving a second play request sent by the application program to the first address, the buffered target media resource to the application program for playing; and after determining, by the media proxy service, whether the buffering transmission procedure of the target media resource has been started, when the buffering transmission procedure has been started but the buffering transmission procedure is suspended, continuing, by the media proxy service, to buffer the target media resource from the server device to the client device based on a buffering progress of the target media resource.

2. The method according to claim 1, wherein after determining, by the media proxy service, whether the buffering transmission procedure of the target media resource has been started, the method further comprises:

sending a second address to the application program, wherein the second address is a local URL address used for accessing the buffered target media resource; and sending, by the media proxy service when receiving a third play request sent by the application program to the second address, the buffered target media resource to the application program for playing.

3. The method according to claim 1, wherein after determining, by the media proxy service, whether the buffering transmission procedure of the target media resource has been started, the method further comprises:

when the target media resource has been buffered in the client device, sending, by the media proxy service, a third address to the application program, to enable the application program to obtain the target media resource from the third address for playing, wherein the third address is a file path of the target media resource buffered in the client device.

4. The method according to claim 1, wherein after determining, by the media proxy service, whether the buffering transmission procedure of the target media resource has been started, the method further comprises:

when the target media resource has been buffered in the client device, sending, by the media proxy service, a fourth address to the application program, wherein the fourth address is a local URL address used for accessing the buffered target media resource; and sending, by the media proxy service when receiving a fourth play request sent by the application program to the fourth address, the buffered target media resource to the application program for playing.

5. The method according to claim 1, wherein:

the first address comprises a local internet protocol (IP) address and a first port that are of the client device; and the second play request is a hypertext transfer protocol (HTTP) request.

6. The method according to claim 5, wherein sending, by the media proxy service when receiving the second play request sent by the application program to the first address, the buffered target media resource to the application program comprises:

listening, by the media proxy service, to the first port of the local IP address; and generating, by the media proxy service, a first response message when obtaining the second play request through listening, wherein the first response message is an HTTP response message, and the first response message comprises a media stream generated based on the target media resource that has been buffered.

7. The method according to claim 1, further comprising:

when the media proxy service receives a play stop request of the application program, and when the buffering transmission procedure is being performed:

suspending, by the media proxy service, the buffering transmission procedure; and recording the buffering progress of the target media resource.

8. A method, comprising:

sending, by an application program on a client device, a first play request to a media proxy service on the client device, wherein the first play request comprises a first identifier, and the first identifier corresponds to a target media resource in a server device;

receiving, by the application program, a destination address sent by the media proxy service;

when the destination address is a local uniform resource locator (URL) address of the client device, sending, by the application program, a second play request to the local URL address;

receiving and playing, by the application program, the target media resource that is sent by the media proxy service in response to the second play request, wherein the target media resource is buffered, via a buffering transmission procedure, by the media proxy service from the server device to the client device;

when the buffering transmission procedure of the target media resource has been started, sending, by the application program, a suspension request that indicates to the media proxy service to suspend the buffering transmission procedure; and receiving, by the application program and from the media proxy service, additional data of the target media resource that the media proxy service continued to buffer from the server device based on a buffering progress of the target media resource when the buffering transmission procedure was started but the buffering transmission procedure was suspended.

9. The method according to claim 8, wherein after receiving, by the application program, the destination address sent by the media proxy service, the method further comprises:

when the destination address is a file path address in the client device, obtaining, by the application program, the target media resource from the file path address for playing.

10. The method according to claim 8, wherein:
the local URL address comprises a local internet protocol (IP) address and a first port that are of the client device; and
the second play request is a hypertext transfer protocol (HTTP) request.

11. The method according to claim 10, wherein sending, by the application program, the second play request to the local URL address comprises:
sending, by the application program, the second play request to the first port of the local IP address.

12. The method according to claim 10, wherein receiving, by the application program, the target media resource that is sent by the media proxy service in response to the second play request comprises:
receiving, by the application program, a first response message that is sent by the media proxy service in response to the second play request, wherein the first response message is an HTTP response message, and the first response message comprises a media stream generated by the media proxy service based on the target media resource that has been buffered.

13. An apparatus, comprising:
one or more processors;
one or more memories storing instructions executable by the one or more processors;
a virtual server executing using the one or more processors and configured to:
receive a first play request of an application program on a client device, wherein the first play request comprises a first identifier, the first identifier corresponds to a target media resource in a server device;
determine, based on the first identifier, whether a buffering transmission procedure of the target media resource has been started;
send a first address to the application program, wherein the first address is a local uniform resource locator (URL) address used for accessing a buffered target media resource;
send, when receiving a second play request sent by the application program to the first address, the buffered target media resource to the application program for playing; and
a file buffer executing using the one or more processors and configured to:
when the buffering transmission procedure has not been started, start the buffering transmission procedure to buffer the target media resource to obtain the buffered target media resource from the server device to the client device; and
when the buffering transmission procedure has been started but the buffering transmission procedure is suspended, continue to buffer the target media resource from the server device to the client device based on a buffering progress of the target media resource.

14. The apparatus according to claim 13, wherein:
the virtual server is further configured to:
send a second address to the application program, wherein the second address is a local URL address used for accessing the buffered target media resource; and
send, when receiving a third play request sent by the application program to the second address, the buffered target media resource to the application program for playing.

15. The apparatus according to claim 13, wherein the virtual server is further configured to:
when the target media resource has been buffered in the client device, send a third address to the application program, to enable the application program to obtain the target media resource from the third address for playing, wherein the third address is a file path of the target media resource buffered in the client device.

16. The apparatus according to claim 13, wherein the virtual server is further configured to:
when the target media resource has been buffered in the client device, send a fourth address to the application program, wherein the fourth address is a local URL address used for accessing the buffered target media resource; and
send, when receiving a fourth play request sent by the application program to the fourth address, the buffered target media resource to the application program for playing.

17. The apparatus according to claim 13, wherein
the first address comprises a local internet protocol (IP) address and a first port that are of the client device; and
the second play request is a hypertext transfer protocol (HTTP) request.

18. The apparatus according to claim 17, wherein configuration of the virtual server to send, when receiving the second play request sent by the application program to the first address, the buffered target media resource to the application program comprises:
the virtual server being configured to listen to the first port of the local IP address; and
the virtual server being further configured to generate a first response message when obtaining the second play request through listening, wherein:
the first response message is an HTTP response message, and
the first response message comprises a media stream generated based on the target media resource that has been buffered.

19. The apparatus according to claim 13, wherein the virtual server is further configured to:
when a play stop request of the application program is received, and when the buffering transmission procedure is being performed:
suspend the buffering transmission procedure; and
record the buffering progress of the target media resource.

* * * * *